US00RE48721E

(19) United States
(12) Reissued Patent
Nouri et al.

(10) Patent Number: US RE48,721 E
(45) Date of Reissued Patent: Sep. 7, 2021

(54) SHAPED ELASTOMERIC CONTAINER WITH INTEGRATED LEAK RESISTANT SEAL

(71) Applicant: STASHER, INC., Emeryville, CA (US)

(72) Inventors: Katousha Ghaemi Nouri, Emeryville, CA (US); Paul Maguire, Goochland, VA (US)

(73) Assignee: Stasher, Inc., Emeryville, CA (US)

(21) Appl. No.: 16/590,281

(22) Filed: Oct. 1, 2019

Related U.S. Patent Documents

Reissue of:
(64) Patent No.: 9,371,153
Issued: Jun. 21, 2016
Appl. No.: 14/639,065
Filed: Mar. 4, 2015

(51) Int. Cl.

| | |
|---|---|
| ***B65D 6/00*** | (2006.01) |
| ***B65D 43/02*** | (2006.01) |
| ***B65D 75/22*** | (2006.01) |
| ***B65D 33/25*** | (2006.01) |
| ***B65D 75/32*** | (2006.01) |

(52) U.S. Cl.
CPC ..... *B65D 75/22* (2013.01); *B65D 11/10* (2013.01); *B65D 33/2541* (2013.01); *B65D 43/0204* (2013.01); *B65D 75/322* (2013.01)

(58) Field of Classification Search
CPC .. B65D 43/0204; B65D 75/322; B65D 75/22; B65D 11/00; B65D 33/2541
See application file for complete search history.

(56) References Cited

U.S. PATENT DOCUMENTS 2,121,988 A * 6/1938 Salfisberg ..... B65D 75/32 206/484.2
2,500,363 A 3/1950 Koeppel
2,613,421 A 10/1952 Madsen
2,637,085 A 5/1953 Madsen
2,674,289 A 4/1954 Silverman
2,777,181 A 1/1957 Morner
2,780,261 A 2/1957 Svec et al.
(Continued)

FOREIGN PATENT DOCUMENTS

EP 1238598 4/1998
EP 0958909 A1 11/1999
(Continued)

OTHER PUBLICATIONS

International Search Report Received in PCT Application Serial No. PCT/US16/20279, dated Mar. 1, 2016, 12 pages.
(Continued)

*Primary Examiner* — Joseph A Kaufman
(74) *Attorney, Agent, or Firm* — Quarles & Brady LLP

(57) ABSTRACT

A container made of an elastomer such as silicone with an integrated leak resistant seal. The seal incorporates press-fit elements with sizes and shapes sufficient to provide a strong seal that resists leakage of liquids from inside the container. The seal is integrated into the container and requires no external clips or clasps. Additional features are provided to facilitate opening such as extended flaps for pulling the sides open, and asymmetric cavities for press-fit elements to reduce the initial opening force. The container itself may be of asymmetrical shape, such as trapezoidal, to provide a wide opening along with a strong seal.

67 Claims, 14 Drawing Sheets

(56) References Cited

U.S. PATENT DOCUMENTS

| | | | | |
|---|---|---|---|---|
| 3,115,689 | A | 12/1963 | Jacobs | |
| 3,149,747 | A * | 9/1964 | Burgess | 220/4.02 |
| 3,280,870 | A | 10/1966 | Bundy | |
| 3,338,285 | A * | 8/1967 | Jaster et al. | 383/65 |
| 3,808,649 | A * | 5/1974 | Ausnit | 383/63 |
| 4,159,728 | A | 7/1979 | Kraus et al. | |
| 4,199,845 | A | 4/1980 | Ausnit | |
| 4,397,404 | A * | 8/1983 | Blanchette | 220/783 |
| 4,512,474 | A * | 4/1985 | Harding | 206/461 |
| 4,736,496 | A * | 4/1988 | Fisher et al. | 24/585.12 |
| 4,842,670 | A | 6/1989 | Callis et al. | |
| 4,845,781 | A | 7/1989 | Strickland et al. | |
| 4,929,487 | A * | 5/1990 | Tilman et al. | 428/463 |
| 5,031,768 | A * | 7/1991 | Fischer | 206/370 |
| 5,046,659 | A * | 9/1991 | Warburton | 220/4.22 |
| 5,067,208 | A | 11/1991 | Herrington et al. | |
| 5,161,286 | A | 11/1992 | Herrington et al. | |
| 5,235,731 | A * | 8/1993 | Anzai et al. | 24/590.1 |
| 5,351,369 | A | 10/1994 | Swain | |
| 5,577,305 | A | 11/1996 | Johnson | |
| 5,584,408 | A * | 12/1996 | Orkisz | 220/4.23 |
| 5,665,301 | A | 9/1997 | Alanko | |
| 5,686,304 | A | 11/1997 | Codner | |
| 5,709,915 | A | 1/1998 | Tomic et al. | |
| 5,729,876 | A | 3/1998 | Johnson | |
| 5,802,677 | A | 9/1998 | Dorman et al. | |
| 6,420,037 | B1 | 7/2002 | Tsuji et al. | |
| 6,625,955 | B2 * | 9/2003 | Aylward | 53/412 |
| 6,632,164 | B1 | 10/2003 | Warburton-Pitt | |
| 6,761,481 | B1 | 7/2004 | Bois | |
| 7,291,370 | B2 | 11/2007 | Gipson et al. | |
| 7,316,052 | B2 | 1/2008 | Pawloski et al. | |
| 7,585,111 | B2 | 9/2009 | Turvey et al. | |
| 7,681,732 | B2 | 3/2010 | Moehlenbrock et al. | |
| 7,891,514 | B1 * | 2/2011 | Walsh et al. | 220/4.21 |
| 7,904,996 | B2 | 3/2011 | Dobreski et al. | |
| 8,157,123 | B2 * | 4/2012 | Tucker et al. | 220/789 |
| 9,156,593 | B2 | 10/2015 | Schreiter et al. | |
| 9,371,153 | B1 | 6/2016 | Nouri et al. | |
| 2004/0144781 | A1 * | 7/2004 | Dees et al. | 220/4.24 |
| 2005/0247709 | A1 * | 11/2005 | Atkins et al. | 220/4.23 |
| 2006/0000076 | A1 * | 1/2006 | Hayes | B65D 43/0204 29/426.5 |
| 2006/0034551 | A1 * | 2/2006 | Linneweil | 383/61.2 |
| 2006/0083833 | A1 | 4/2006 | Pezzana et al. | |
| 2006/0289550 | A1 * | 12/2006 | Guardigli | 220/810 |
| 2007/0095848 | A1 * | 5/2007 | Galland et al. | 220/784 |
| 2007/0183692 | A1 * | 8/2007 | Pawloski | 383/61.2 |
| 2008/0118609 | A1 * | 5/2008 | Harlfinger | B65D 43/0206 426/106 |
| 2009/0110335 | A1 | 4/2009 | LeBoeuf | |
| 2009/0134179 | A1 * | 5/2009 | Kidd et al. | 220/834 |
| 2009/0134180 | A1 * | 5/2009 | Kidd et al. | 220/836 |
| 2009/0223966 | A1 * | 9/2009 | Kidd et al. | 220/324 |
| 2010/0218690 | A1 | 9/2010 | Huber et al. | |
| 2011/0038564 | A1 | 2/2011 | Slansky | |
| 2011/0103717 | A1 * | 5/2011 | Kasai | B31B 19/90 383/64 |
| 2012/0008880 | A1 | 1/2012 | Toth | |
| 2012/0037618 | A1 | 2/2012 | Perez | |
| 2012/0106874 | A1 * | 5/2012 | Pawloski | 383/63 |
| 2012/0152943 | A1 * | 6/2012 | Leoncavallo et al. | 220/4.21 |
| 2013/0091667 | A1 * | 4/2013 | Zerfas | A44B 18/0007 24/449 |
| 2013/0105352 | A1 | 5/2013 | Munguia | |
| 2014/0270579 | A1 | 9/2014 | Nouri | |
| 2014/0270587 | A1 * | 9/2014 | Schreiter et al. | 383/64 |
| 2015/0232234 | A1 * | 8/2015 | Plourde | A44B 19/24 24/30.5 L |
| 2015/0367987 | A1 * | 12/2015 | Clark | B65D 77/2024 220/23.86 |
| 2016/0031609 | A1 | 2/2016 | Tseng et al. | |

FOREIGN PATENT DOCUMENTS

| | | | |
|---|---|---|---|
| FR | 2302247 | A1 | 9/1976 |
| GB | 1549021 | A | 8/1979 |
| JP | 1981147909 | | 11/1981 |
| JP | H08217093 | | 8/1996 |
| JP | 2001031138 | A | 2/2001 |
| JP | 2008056279 | | 3/2008 |
| JP | 2010168098 | A | 8/2010 |
| JP | 2015016018 | | 1/2015 |
| WO | 2014163712 | | 10/2014 |

OTHER PUBLICATIONS

Petition for Inter Partes Review of U.S. Pat. No. 9371153 (IPR2018-01216), 89 pages.

Declaration of Paul Koch, Ph.D. In Support of Petition for Inter Partes Review (IPR2018-01216), 136 pages and Curriculum Vitae in Support thereof.

Rehak, Melanie, "Who Made that Ziploc Bag", The New York Times Magazine dated Jul. 25, 2014.

"Handbook of molded and extruded rubber", Goodyear Tire and Rubber Company, Akron (1949), retrieved from http://hdl.handle.net/2027/mdp.39015002005448.

Correspondence from Robert F. Kramer of Dentons US LLP to Mr. R. William Beard, Jr. of Slayden Grubert Beard PLLC, dated Apr. 9, 2018 in re Stasher, Inc.—Zip Top LLC, 5 pages.

Correspondence from R. William Beard, Jr. of Slayden Grubert Beard PLLC to Danna J. Cotman, Esq. of ARC IP Law, PC dated Mar. 16, 2018 in re "Stasher Patents", 16 pages.

Correspondence from Danna J. Cotman of ARC IP Law, PC to Rebecca Finell, dated Mar. 9, 2018 in re "Notification of Intellectual Property Rights", 2 pages.

"Stasher Monthly Gross Sales" for the years 2016 through 2018, 2 pages.

Correspondence from reddot design award to Stasher, Inc. in re "Your Success in the Red Dot Award: Product Design 2016", Mar. 2016, 3 pages.

"Global Innovation Awards" 2016 Winner Plaque (1 page) and Photograph of plaque being presented (1 page).

Original Complaint filed in the United States District Court for the Western District of Texas, Austin Division in Civil Action No. 1:18-cv-00276 (*Zip Top, LLC and Finell Co., LLC* v. *Blue Avocado Co.*) on Apr. 2, 2018, 30 pages.

"Zip Top Containers" retrieved from https://vimeo.com/259047617 (3 pages).

"Elastomer: chemical compound", Encyclopedia Britannica, retrieved from https://web.archive.org/web/20150704001810/https://www.britannica.com/science/elastomer (5 pages).

Shark Tank Season 9 Episode 15—Stasher Segment (24 pages) and Segment Offset Summary (1 page); Undated.

"IHA Announces Finalists for Global Innovation Awards for Product Design", Press Release International Housewares Association, Feb. 17, 2016, 4 pages.

S9 E15 Episode 15, ABC Episode Summary, retrieved from https://abc.go.com/shows/shark-tank/episode-guide/season-09/15-episode-15 (2 pages).

The American Heritage College Dictionary, Third Edition, 1997 (8 pages).

Declaration of Katousha Nouri in Support of Patent Owner Preliminary Response to Inter Partes Review (IPR2018-01216), 56 pages.

Declaration Robert M. Kimmel in Support of Patent Owner Response to Inter Partes Review (IPR2018-01216), 56 pages.

Declaration of Katousha Nouri in Support of Patent Owner Response to Petition for Inter Partes Review (IPR2018-01216), 7 pages.

Declaration of Katousha Nouri in Support of Patent Owner Preliminary Response to Petition for Inter Partes Review (IPR2018-01216), 6 pages.

Declaration of Paul Maguire in Support of Patent Owner Response to Petition for Inter Partes Review (IPR2018-01216), 17 pages.

(56) References Cited

OTHER PUBLICATIONS

Declaration of Robert M. Kimmel in Support of Patent Owner Preliminary Response to Petition for Inter Partes Review (IPR2018-01216), 6 pages.
Declaration of Haley Haggerstone in Support of Patent Owner Response to Petition for Inter Partes Review (IPR2018-01216), 5 pages.
Declaration of Toby Thomas in Support of Patent Owner Response to Petition for Inter Partes Review (IPR2018-01216), 88 pages.
"Pre-Order Zip Tops on Kickstarter", newsletter dated Oct. 1, 2018 (2 pages).
Internal Stasher, Inc. Email Correspondence in re "½ gallon price competition on Amazon" dated Jun. 15, 2018 through Jul. 9, 2018, 26 pages.
"Ziploc Brand Freezer Bags" Product Listing retrieved from www.watsinsidescjohnson.com/us/en/brands/ziploc/ziploc-brand-freezer-bags, 2 pages.
Email Correspondnece from Susan Cassar of Wacker Chemical Corporation in re: "Stress/strain curve legend", dated Apr. 10, 2019, 1 page.
Patent Owner Preliminary Response for Inter Partes Review (IPR2018-01216), 80 pages.
Supplemental Patent Owner Preliminary Response for Inter Partes Review (IPR2018-01216), 9 pages.
Decision Institution of Inter Partes Review, (IPR2018-01216), 39 pages.
Patent Owner Response for Inter Partes Review (IPR2018-01216), 84 pages.
"National Certification in Plastics Study Guide", The Society of the Plastics Industry (SPI), Inc., published by Hanser Publishers, Munich (2000), 5 pages.
"Guide to Plastics Property and Specification Charts", by the Editors of Modern Plastics Encyclopedia (1974) 8 pages.
Polymer Data Handbook by Oxford University Press, Inc. (1999), 1102 pages.
Bhowmick, Anil, "Mechanical Properties of Polymers", Encyclopedia of Life Support Systems, 16 pages.
Meltzer, et al., "The Influence of Fillers and Degree of Vulcanization on the Mechanical Properties of Hard Rubber Polyblends", vol. 8 pp. 773-789 (1964).
Wang, et al., "Influence of Prolonging Vulcanization on the Structure and Properties of Hard Rubber", The University of South Australia (2007) 11 pages.
Rosato, Dominick, "Rosato's Plastics Encyclopedia and Dictionary", Hanser Publishers (1993) 8 pages.
Soroka, Walter, "Illustrated Glossary of Packaging Terminology" (2008) 5 pages.
Billmeyer, Fred, "Textbook of Polymer Science", Interscience Publishers (1962), 4 pages.
Whittington, Lloyd, "Whittington's Dictionary of Plastics", Technomic Publishing Co. (1978), 5 pages.
Stasher Website Acclaim, 16 pages, Undated.
Oral Deposition of Paul Edward Koch, dated Apr. 11, 2019 conducted in Case No. IPR2018-01216 (91 pages).
Hamilton, James, "An Overview of Silicone Rubber", published Jun. 1, 2003 (7 pages).
"Standard Terminology Relating to Plastics", ASTM International (2019), retrieved Apr. 9, 2019, 17 pages.
International Standard 1382 Rubber Vocabulary, retrieved Apr. 15, 2019, 132 pages.
Original Schematic re "Tortous Path".
Stasher Seal Cross Section, Undated, 1 Page.
Stasher, Inc. listing of Accolades, Undated, 3 Pages.
"U.S. Population: How many plastic freezer, sandwich or storage bags have you used in the last 7 days", Statista (2018 Data), 2 pages.
Parker, Laura, "Fast Facts about Plastic Pollution", National. Geographic, Dec. 20, 2018, 10 pages.
"Excellence in Housewares Awards 2018" program for event held in Royal Lancaster London on Oct. 3, 2018, 2 pages.
"Thirteen Companies Honored with IHA Global Innovation Awards for Product Design", International Housewares Association, dated Mar. 3, 2019, 2 pages and photograph of plaque presentation (1 page).
"About the International Housewares Association—IHA", https://www.housewares.org/iha/default.
"2019 IHA Global Innovation Award Global Honorees and Finalists", Undated, 8 pages.
LyondellBasell Petrothene NA940085 Low Density Polyethylene (Film Grade) Properties Specification, Undated, 4 pages.
"Easy Zipper Audit", Undated, 1 page.
"Zip Top Containers are all you need" Undated, 1 page.
"Keep America Beautiful", Wikipedia.org, Undated, 6 pages.
"Frequently Asked Questions" retrieved https://ziptop.co/apps/help-center#!im-a-blogger-can-i-get-a-sample-to-review, retrieved Mar. 9, 2018, 3 pages.
"Red Dot", Wikipdia.org, retrieved from https://en.Wikipedia.org/wiki/red_dot, undated, 3 pages.
Baron, Abigail, et al., "The 7 most brilliant product designs of 2016", Inc. Magazine, Undated, 9 pages.
Hill, Danielle, "What are Ziploc Brand Bags Made of", Leaf Group Ltd, Undated, 6 pages.
"A Hard Character", Wacker Chemie AG, retrieved Apr. 2, 2019, 4 pages.
"Hardly any Strain Under Stress" Diagram, Undated, 1 page.
"Standard Terminology Relating to Rubber", ASTM Intl., Retrieved on Apr. 2, 2019, 17 pages.
"Overview of Materials for Ethylene Vinyl Acetate Copolymer, Film Grade", MatWeb Material Property Data, retrieved from http://www.matweb.com/search/datasheetText.aspx?bassnum=O4107 on Apr. 6, 2019, 2 pages.
Die 299 45% HDPE (.103 Width) Track Specifications, Dated Jul. 26, 1999, 2 pages.
Die 324 (2044-2001) Bolthouse Carrot Tamper Evident Specifications, Dated Jul. 14, 1999, 1 page.
Judgment Terminating the Proceeding issued in Case IPR2018-01216 (4 pages).
Consolidated Markman Briefing filed in Civil Action No. 6:18-cv-312 on May 14, 2019, 147 pages.
Declaration of Toby Thomas in Support of Plaintiff's Opening Claim Construction Brief (Civil No. 6:18-cv-312), filed May 14, 2019, 13 pages.
Declaration of Robert Kimmel in Support of Plaintiff's Opening Claim Construction Brief (Civil No. 6:18-cv-312), filed May 14, 2019, 27 pages, and Curriculum Vitae in Support thereof (9 pages).
Declaration of Paul Koch in Regarding Claim Construction Issues (Civil No. 6:18-cv-312), filed May 14, 2019, 11 pages.
"The Compact Oxford English Dictionary—2nd Edition", Clarendon Press—Oxford; 5 pages.
"Webster's Ninth New Collegiate Dictionary", Merriam-Webster, Inc. (1988), 4 pages.
Joint Claim Construction Statement filed in Civil Action No. 6:18-cv-312, on May 14, 2019, 6 pages.
Claim Construction Order filed in Civil Action No. 6:18-cv-312, on Jun. 19, 2019, 10 pages.
Initial Claim Construction Order filed in Civil Action No. 6:18-cv-312, on Jun. 7, 2019, 3 pages.
First Amended Answer and Counterclaims, filed in Civil Action No. 6:18-cv-312, on May 27, 2019, 17 pages.
"Copycat 2" undated images, 4 pages.
"Copycat 3" images of samples purchased Mar. 2019, 6 pages.
"Copycat 4", retrieved from alibaba.com, Undated, 3 pages.
International Preliminary Report on Patentability Received in PCT Application Serial No. PCT/US16/20279, Sep. 14, 2017, 10 pages.
Extended Search Report issued in EP16759364.9, dated Sep. 26, 2018, 8 pages.
Office Action issued in JP2017-546909, dated Jan. 29, 2020 (7 pages), and corresponding English Translation (6 pages).
Examination Report issued in AU2016226375, dated Feb. 4, 2020, 4 pages.
Response to Examination Report dated Apr. 17, 2020 (22 pages).
Annex A: Commercial embodiments of Munguia, 3 pages, Undated.

(56) References Cited

OTHER PUBLICATIONS

Engineers Edge, Coefficient of friction values for various materials, retrieved from https://www.engineersedge.com/coefficients_of_friction.htm on Apr. 17, 2020 (4 pages).
Professional Plastics, Coefficient of friction for a large number of different types of plastics, undated (4 pages).
Annex G: Granted Canadian Claims (CA2999323/ Jan. 17, 2020) based off PCT/US2016/020279.
Annex H: Granted Chinese Claims (English Translation) (2020).
Annex I: Applicant's commercial product discussed in view of the current claims, undated (5 pages).
Communication pursuant to Rules 70(2) and 70a(2) EPC issued in EP16759364.9, dated Oct. 12, 2018 (1 page), and response thereto dated Apr. 18, 2019 (3 pages).
Examination Report (Communication pursuant to Article 94(3) EPC) issued in EP16759364.9, dated Jun. 17, 2019 (5 pages), and response thereto dated Oct. 14, 2019 (8 pages).
Examination Report (Communication pursuant to Article 94(3) EPC) issued in EP16759364.9, dated Nov. 26, 2019 (4 pages); and response thereto (22 pages), including claims (original and marked-up); Annex 1 (5 pages).
Annex A to Examination Report Response in EP16759364.9, "Example 1: Redrocket Silicone Food Storage Bag" at https://tinyurl.com/s225yz6. (3 pages).
"Coefficient of Friction Equation and Table Chart—Engineers Edge", webpage retrieved from www.engineersedge.com/coefficients_of_friction.htm; retrieved on Apr. 17, 2020 (4 pages).
"Mechanical Properties of Plastic Materials", published by Professional Plastics, Printed Apr. 17, 2020 (4 pages).
Examination Report (Communication pursuant to Article 94(3) EPC) issued in EP16759364.9, dated Jun. 24, 2020 (4 pages).
Office Action Input and Amended Claims filed in response to Office Action dated Jan. 29, 2020 issued in JP2017-546909, and English Translation.
Office Action issued in KR 10-2017-7028124, dated Jun. 25, 2020 (10 pages) and English Translation thereof (10 pages).
Office Action filed in KR 10-2017-7028124, dated Aug. 25, 2020 (14 pages), Claim Amendments and English Translation thereof.
Examination Report Response filed in AU2016226375, dated Sep. 2, 2020, 29 pages, and Statement of Proposed Amendments (20 pages).
Notice of Allowance received in AU2016226375, dated Oct. 2, 2020 (4 pages).
Office Action issued in CA2999323, dated Jan. 24, 2020 (4 pages).
Office Action Response filed in CA2999323, dated Feb. 18, 2020 (39 pages).
Notice of Allowance issued in CA2999323, dated Apr. 1, 2020 (1 page).
Certificate of Patent issued in CA2999323, dated Jun. 9, 2020 (49 pages).
International Search Report Received in PCT Application Serial No. PCT/US14/00032, dated Jul. 30, 2014, 1 page.

* cited by examiner

FIGURE 8
(Amended)
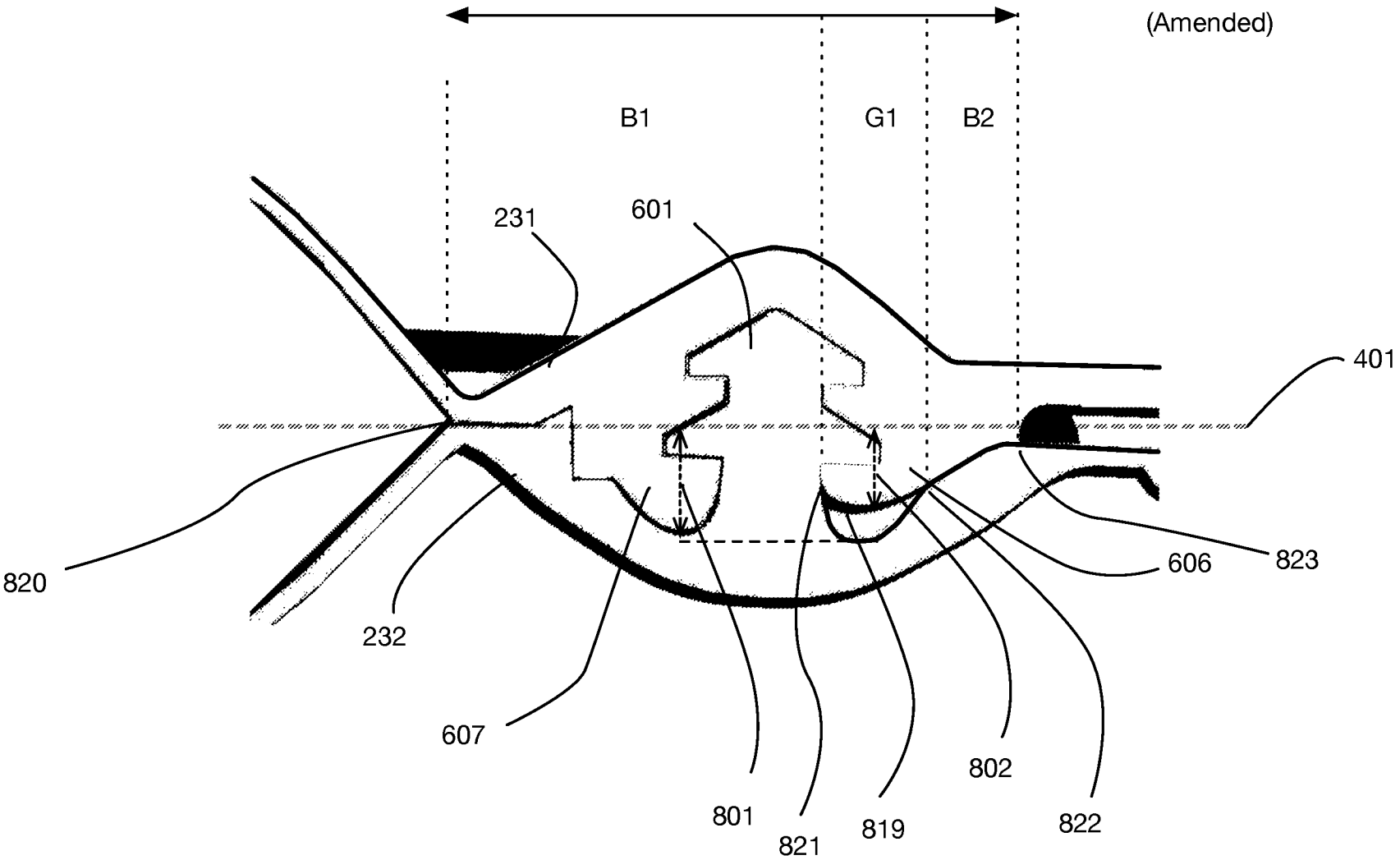

SHAPED ELASTOMERIC CONTAINER WITH INTEGRATED LEAK RESISTANT SEAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a Reissue Continuation of U.S. application Ser. No. 14/639,065, filed on 4 Mar. 2015.*

BACKGROUND OF THE INVENTION

1. Field of the Invention

One or more embodiments pertain to the field of storage and transport bags and containers and to seals for these bags and containers. More particularly, but not by way of limitation, one or more embodiments enable a shaped elastomeric bag with an integrated leak resistant seal. Embodiments may be used for storage, transport, and cooking of food, including liquids, and for other applications. Embodiments may be durable and reusable. Embodiments of the invention incorporate a leak resistant seal to provide enhanced sealing with a mechanism that is integrated into the container.

2. Description of the Related Art

Sealable bags and containers are well known in the art. For example, Ziploc® plastic bags have a zipper-like sealing mechanism integrated into the opening of the bag. More recent innovations have modified sealable bags to be more durable, reusable containers, often based on silicone materials. For example, both Munguia in US Patent Publication 2013/0105352 and LeBoeuf in US Patent Publication 2009/0110335 teach silicone food storage bags with seals.

A limitation of the existing art in sealable bags is that the integrated seal designs provide relatively weak sealing force. For example, Ziploc® bags are closeable, but they are not leakproof. This lack of leak resistance is a consequence of the relatively small sealing area and the simple track and groove shapes of the Ziploc® seal. LeBoeuf discloses a seal with a track and groove, but specifically notes that an additional mechanical clasp may be needed as an added method of closure. Hence the integrated sealing portion of the container disclosed in LeBoeuf may not be leak resistant without external clasping members.

This difficulty in providing an integrated leak resistant seal was taught in 1946 by Koeppel in U.S. Pat. No. 2,500,363. As Koeppel states: "Closures for containers of this nature have been formed in various ways, but when the opening in the bag or container is made sufficiently large to receive ice cubes or relatively large lumps of ice it is difficult to seal the opening effectively. Efforts have been made to overcome this difficulty by providing the container with a thickened portion about the mouth of the opening with complementary zig-zag or tongue and groove surfaces to form a seal. However, even such constructions are ineffective to prevent leakage unless they are pressed together with considerable force." Koeppel then teaches a design using an external mechanical clip attached to a bag to provide the necessary sealing force. In this sense Koeppel arrives at a similar solution to LeBoeuf using an external clasp.

While use of external clips or mechanical clasps can provide seals, they are less convenient for the user and they require additional manufacturing cost and complexity. Therefore there is a need for an elastomeric container with an integrated leak proof seal, which does not require such additional elements to enhance sealing force.

BRIEF SUMMARY OF THE INVENTION

Embodiments of the invention enable a shaped elastomeric container with an integrated leak resistant seal. Such a container may be used for example to store and transport liquids or solids or both, include food products. Embodiments of the invention may be of various shapes and sizes, including but not limited to rectangular, square, circular, trapezoidal, cylindrical, elliptical, polygonal, cubical, or any convenient shape for the intended use of the container. Embodiments of the invention utilize elastomers among their materials to provide properties such as flexibility, heat-resistance, microbial resistance, and ease of manufacturing. Other materials may be used as well for shaping, strengthening, decorating, or any other purpose. Some embodiments may employ silicone as one of the elastomers in the container. Silicone offers several potential advantages including non-toxicity, stick resistance, ability to be heated such as in an oven, ability to be frozen as in a freezer, and ability to be molded into various shapes in manufacturing processes.

Embodiments of the invention may include two parts of an enclosure, referred to as the top enclosure and the bottom enclosure. The top enclosure and bottom enclosure may be joined along some of their edges to form a container with an opening. The edge nearest the opening is referred to herein as the front edge; the edge opposite the front is referred to as the back edge. The edges running between the back and front are referred to as the left edge and the right edge. The joints between the parts of the enclosure may be made of an elastomer as well, or may be made of other materials. Any joining technique such as molding, gluing, taping, sewing, stapling, welding, or any other technique may be used to form the enclosure. The enclosure may partially surround an inner volume designed for the storage or transport of materials inside the container. In some embodiments the container may be sufficiently rigid so that this inner volume is present even when the container is empty. In other embodiments the container may be designed to collapse when empty so that the inner volume is not apparent unless items are inside the container.

Embodiments may have one or more edges of the enclosures fully or partially open for the insertion and removal of materials. Adjacent to or proximal to these open edges, embodiments may include a seal designed to close off the inner portion of the container that is utilized to open and close the container. In some embodiments the seal includes two elements called press-fit elements that are designed to press together and seal when closed. The press-fit elements are referred to herein as the top press-fit element and the bottom press-fit element. They may be located anywhere on the container where it is necessary or convenient to provide a seal. These press-fit elements may have complementary profiles that come together at a common boundary when the elements are pressed together. Various embodiments of the invention employ designs for the press-fit elements that contribute to the strength of the seal. In some embodiments the seal is designed for leak resistance. For example, some embodiments provide a seal that can hold one to two cups of water inside the container without leaking, even when the container is inverted with the seal pointing downwards.

In one or more embodiments the leak resistance of the seal is enhanced by utilizing sufficient material thickness in the press-fit elements. Thicker material in the press-fit elements increases the sealing force of the seal. In some embodiments the average material thickness of both the upper press-fit element and the lower press-fit element is at least 0.25 cm, in other embodiments, any value up to 0.5 cm, in other embodiments any value between 0.5 cm and 0.75 cm and in other embodiments 1.0 cm, when measured across the common boundary between the press-fit elements. Other embodiments may use even thicker material for greater sealing. Some embodiments do not rely on material thickness as a major factor for sealing strength, but instead or in addition use the shape of the press-fit elements to create enhanced leak-resistance.

In one or more embodiments of the invention the front edge of the enclosure may be longer than the back edge. For example, a container may be roughly trapezoidal in shape with the front edge longer than the back edge. Such embodiments may provide a benefit of a larger opening area for the insertion and removal of materials. This benefit may be particularly valuable when the press-fit elements of the seal utilize thick material, since the opening may pinch together at the left and right edges.

In one or more embodiments, the top press-fit element and the bottom press-fit element have one or more male or female elements that mate together to form part of the seal. Different embodiments may employ any convenient shapes, sizes, and numbers for these male and female elements. In some embodiments either the top press-fit element or the bottom press-fit element, or both, may have a vertical protrusion extending upward or downward into a corresponding cavity on the other press-fit element. In some embodiments one or more of the vertical protrusions may have one or more horizontal ridges emerging horizontally from the vertical protrusion. These ridges may be implemented to lock into place into corresponding indentations on the opposite press-fit element. Some embodiment use at least two horizontal ridges attached to a single vertical protrusion, spaced out vertically at different heights, to provide additional sealing force. Other embodiments may use only a single horizontal ridge, or no horizontal ridges. The shapes and sizes of the vertical protrusion and the horizontal ridges, if present, may differ across embodiments. For example, horizontal ridges may be triangular, circular, elliptical, square, rectangular, or any other shape extending horizontally from a vertical protrusion. In some embodiments a vertical protrusion may be at least 0.2 cm, e.g., 80%, or any other percentage of the overall thickness of the upper and lower press-fit elements, in other embodiments, any value between 0.4 cm and 0.6 and in other embodiments 0.8 cm tall. In some embodiments a horizontal ridge may be at least 0.1 cm wide or any other width, including any value greater than 0.1 cm, such as 0.2 cm or wider.

To achieve a leak resistant seal, one or more embodiments of the invention may incorporate press-fit elements of substantial size and material thickness. Such designs present a potential challenge in that the sealing elements may extend a considerable distance away from the top and bottom enclosures. To mitigate this effect, one or more embodiments of the invention may offset the top and bottom press-fit elements so that they are more centered along the horizontal plane of the container. In particular, in one or more embodiments, the top press-fit element or the bottom press-fit element, or both, may have cavities and protrusions that extend both above and below the center horizontal plane between the top and bottom enclosures. For example, a bottom press-fit element might have cavities below the center horizontal plane, and a vertical protrusion that extends above the center horizontal plane. Thus, one or more embodiments enable containers with leak resistant seals that have sealing elements better aligned or centered with the sides of the containers' enclosures. Furthermore, thicker seals provide a tactile area in which to hold the container while minimizing the chance of dropping the container. Thus the seal is configured as a handle to hold the container in one or more embodiments when the seal is thick enough based on the coefficient of static friction and based on the shape of the seal in order to hold the desired contents securely.

In some embodiments of the invention the top and bottom press-fit elements may extend to portions of the left edge or right edge of the top and bottom enclosures. In such embodiments the opening mechanism for the container may incorporate a hinged area or similar design along the sides that allows the container to open wider than if it can only open on the front edge. Such embodiments may provide considerable convenience by making it easier for a user to insert items into the container or remove items from the container.

One or more embodiments of the invention may provide flaps or tabs extending from the front edge or the sides of the top and bottom press-fit elements. Such flaps or tabs may be used to hold the edges of the container in order to pull it open from its sealed position. These flaps may be of any convenient size or shape, and may be placed in any convenient location. In some embodiments for example, the flaps may be shaped roughly as an arc with the widest portion in the center of the front edge. In other embodiments the flaps may consist of simple tabs emerging from the center of the front edge or from other locations. In some embodiments there may be a bottom tab and a top tab, with the bottom tab longer than the top tab. Other embodiments may reverse this arrangement and may have a top tab that is longer than the bottom tab. In other embodiments the flaps or tabs may be of equal size. A longer flap or tab may provide a lever arm for the user when pulling the seal open, allowing the user to more easily open the seal. This feature may be particularly valuable for a very strong seal that is designed for leak resistance, since the user must have a mechanism to overcome the sealing force when opening the container. In one or more embodiments there may be a gap between the top flap and the bottom flap to make it easier for the user to grasp one or both of the flaps for opening.

In one or more embodiments the top or bottom press-fit element may incorporate a vertical protrusion surrounded by two cavities, one forward of the protrusion and one backward from the protrusion. In some embodiments the depths of these two cavities may be unequal. For example, in one or more embodiments a forward cavity may be shallower than a back cavity. A potential advantage of such an asymmetric shape for the press-fit element is that the force required to begin opening the seal from the forward edge may be less than the sealing force towards the back edge. This may facilitate opening by the user while maintaining a strong seal. Once the user has broken the seal at the forward cavity, the additional lever arm provided by the open portion of the press-fit element may be used to continuing opening the back part of the seal.

Embodiments of the invention may incorporate various shapes and sizes for the press-fit elements. In some embodiments the shape of the boundary between the top press-fit element and the bottom press-fit element may contribute significantly to the sealing force. Embodiments may use winding paths for the boundary with multiple changes of direction to improve the seal. Such winding paths provide two potential advantages. First, they can provide resistance to movement of the press-fit elements in multiple directions. Secondly, they can lengthen the distance that liquid must travel to escape from the seal, improving leak resistance. The direction of resistance to movement is quantified by the direction of the normal vector to the boundary surface. In some embodiments a boundary path may provide normal vectors that point in four different directions, including up, down, forward, and backward. Some embodiments may provide more or fewer normal vectors. The normal vectors are orthogonal to the surface whether planar or curved at a particular point along the plane or curve. In some embodiments the normal vectors to the boundary surface may point approximately in these four directions, but may point somewhere in all four quadrants of the vertical plane perpendicular to the back-to-front axis of the container. With normal vectors in all quadrants, the press-fit elements provide sealing forces in all directions. In other embodiments the winding path of the boundary may change directions multiple times to provide multiple normal vectors in all directions on different segments of the boundary path. For example, in one or more embodiments there may be at least three different segments of the boundary path with normal vectors in each of the four directions or four quadrants. Such paths further increase the sealing force.

In one or more embodiments the winding path of the press-fit boundary will be significantly longer than the straight-line back-to-front horizontal distance across the press-fit elements. This longer path improves the sealing by lengthening the path for liquids to travel out of the seal. For example, in some embodiments the length of the boundary path is at least twice as long as the horizontal back-to-front distance between the start and end of the boundary path. Other embodiments may utilize even longer boundary paths with greater distance ratios.

BRIEF DESCRIPTION OF THE DRAWINGS

The above and other aspects, features and advantages of the ideas conveyed through this disclosure will be more apparent from the following more particular description thereof, presented in conjunction with the following drawings wherein:

FIG. 8 illustrates the top and bottom press-fit elements of an embodiment of the invention in which a front vertical cavity is shallower than a back vertical cavity.

DETAILED DESCRIPTION OF THE INVENTION

A shaped elastomeric container with an integrated leak resistant seal will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

Figure 1:
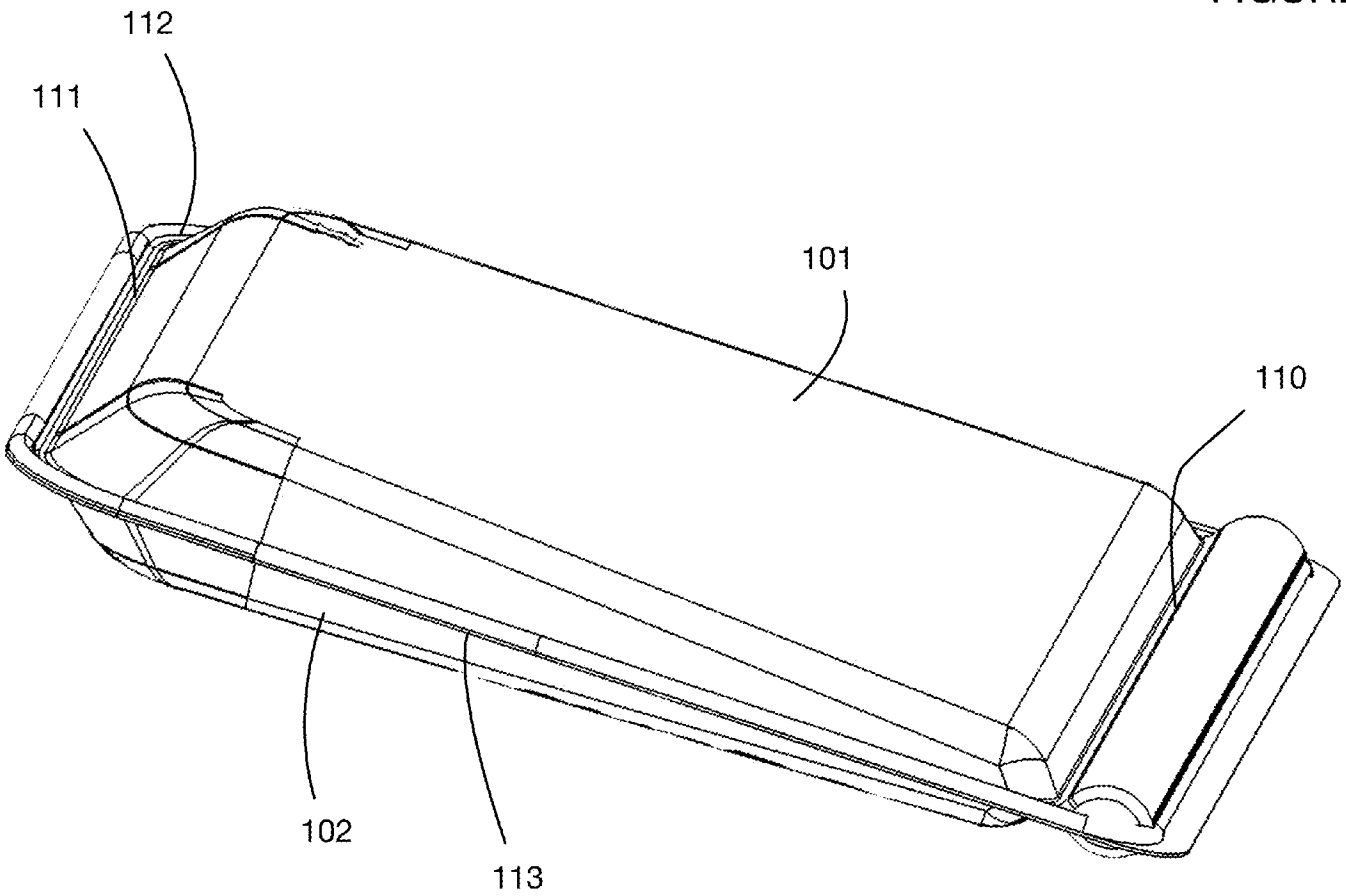
FIG. 1 illustrates a perspective view of an embodiment of the invention with the seal closed.

FIG. 1 illustrates an embodiment of the invention with the container seal closed, shown in a perspective view. In some embodiments the container's materials may include elastomers, such as silicone or other rubbers or polymers. Other materials may be included in various embodiments. In some embodiments the body of the container may be rigid; in other embodiments it may be flexible. Embodiments that incorporate silicone offer a benefit of heat-resistance; thus for example such embodiments may be placed in an oven to heat food contained in the container. Some embodiments may be configured to be reused; other embodiments may be configured for single uses.

Figure 12:
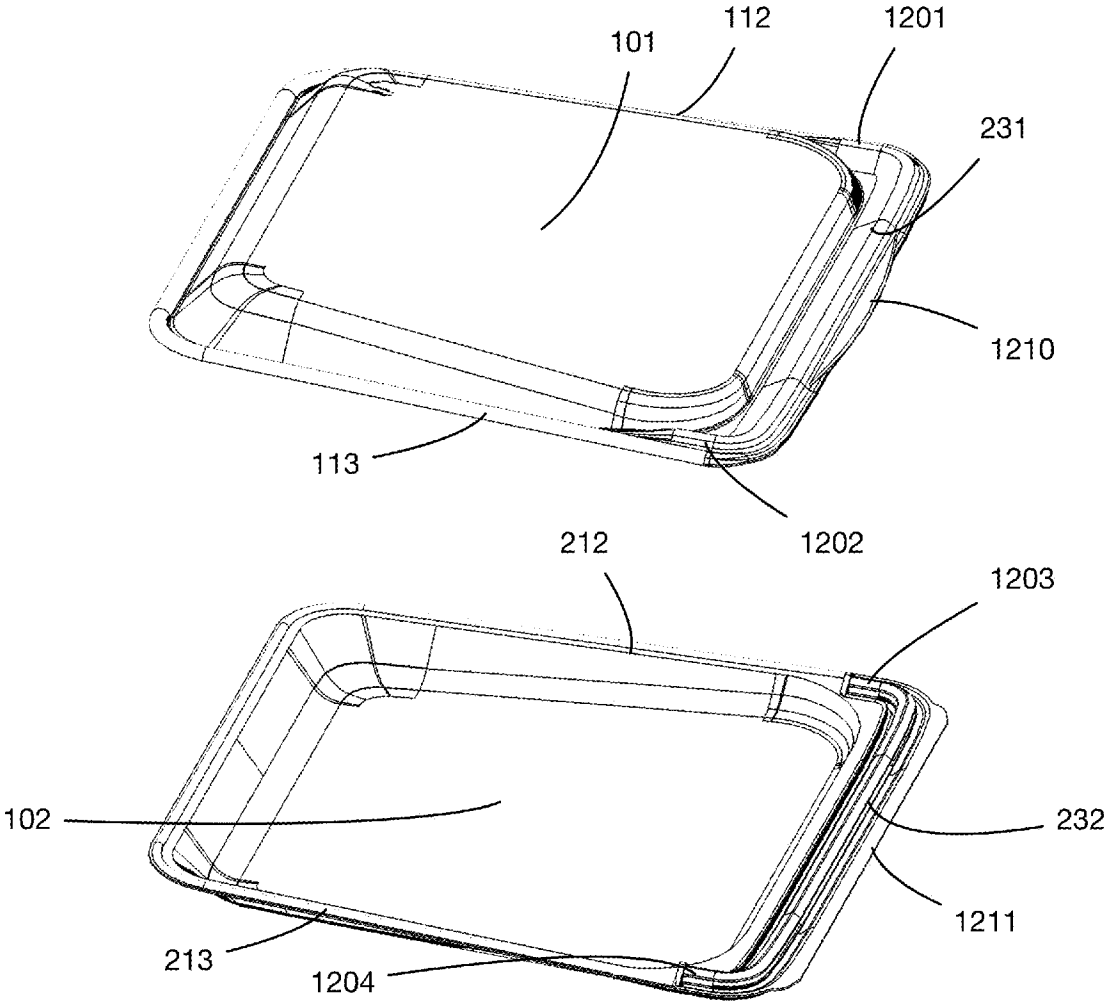
FIG. 12 illustrates an embodiment of the invention in exploded view when formed from one component, or for example before attachment of at least a portion of the top and bottom element, with the seal's press-fit elements extending from the front edges to portions of the left and right edges of the enclosures. This embodiment also illustrates a top flap and a bottom flap extending forward from the seal.
Figure 14:
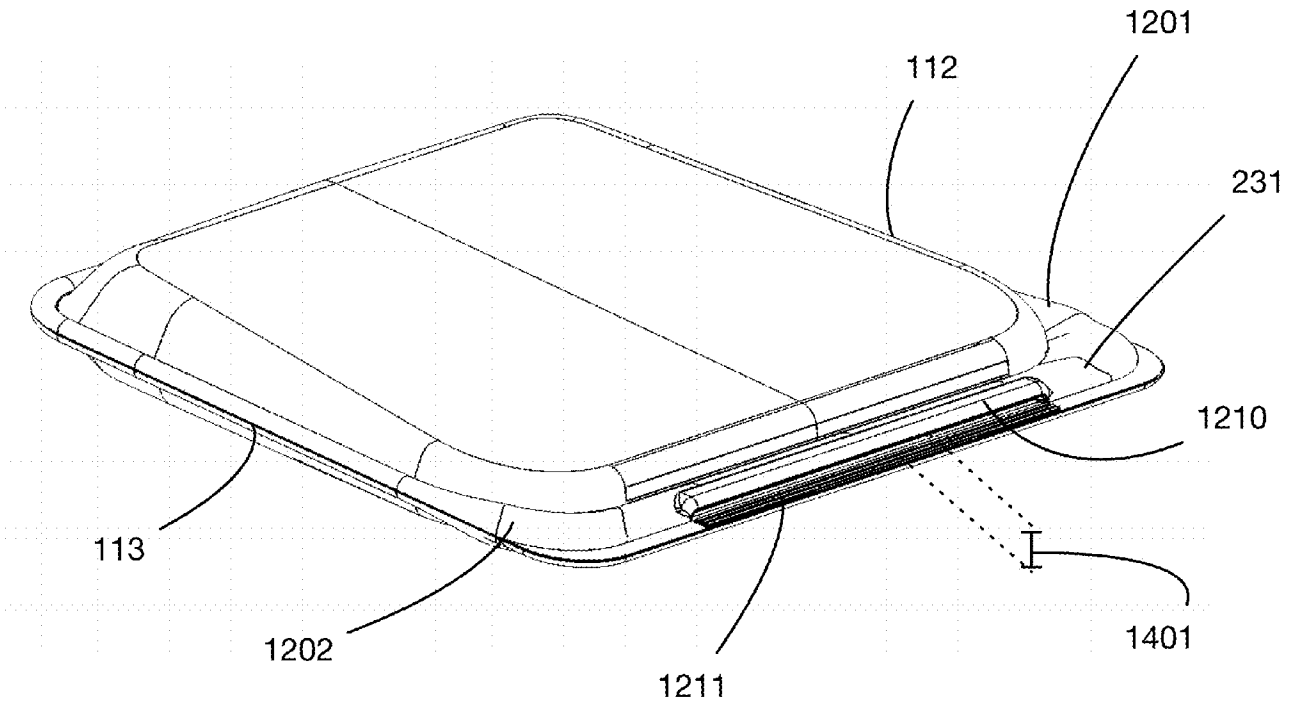
FIG. 14 illustrates another embodiment of the invention with the seal's press-fit elements extending from the front edges to portions of the left and right edges of the enclosures, and with top and bottom flaps configured with a vertical gap between them to facilitate grasping the flaps.

FIG. 1 shows an embodiment of a container with top enclosure 101 and bottom enclosure 102. Top enclosure 101 has front edge 110, back edge 111, left edge 112 and right edge 113. In the embodiment shown the top enclosure and the bottom enclosure are contiguous when formed from one element or joined via a seam along the back, left, and right edges for embodiments that utilize a plurality of components to form the apparatus. The front edges are not joined permanently, but are in contact when closed and are held closed via the sealing elements that extend forward from the front edges. Top and bottom enclosures may be formed or joined using integrated molding of both enclosures, or via various other methods to join elastomeric elements together. In some embodiments it is desirable that the joints between the top and bottom enclosures be continuous without gaps, so that the container can hold liquids without leaking. Furthermore, thicker seals such as seal 110 provide a tactile area in which to hold the container while minimizing the chance of dropping the container. Thus seal 110 is configured as a handle to hold the container in one or more embodiments, for example from the top, (right side as shown in FIGS. 1, 12 and 14) when the seal is thick enough based on the coefficient of static friction of the material utilized to construct at least the seal portion of the container and based on the shape of the seal in order to hold the desired contents securely.

Figure 2:
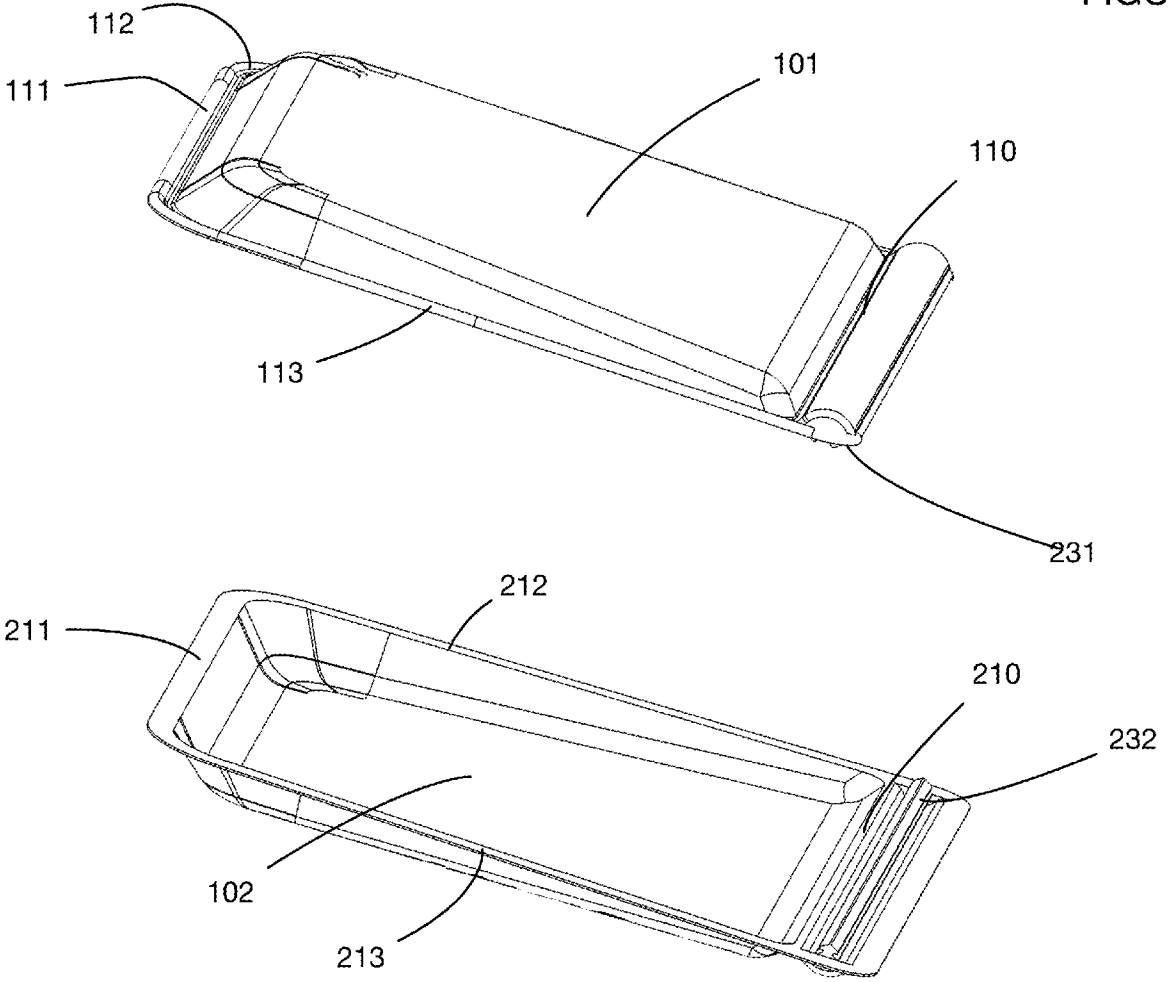
FIG. 2 illustrates the top and bottom enclosures and top and bottom press-fit elements of the embodiment shown in FIG. 1, for example in exploded view, when formed from one component or before attachment of portions of the top and bottom portions to one another.

FIG. 2 shows an exploded view of FIG. 1 with the top enclosure 101 and the bottom enclosure 102 shown separately. As in FIG. 1, top enclosure 101 has edges 110, 111, 112, and 113. Extending forward from front edge 110 of top enclosure 101 is top press-fit element 231. In FIG. 2 the edges of bottom enclosure 102 are also visible: front edge 210, back edge 211, left edge 212, and right edge 213. In the embodiment shown, the edges 210, 211, 212, and 213 of the bottom enclosure are in contact with edges 110, 111, 112, and 113 respectively of the top enclosure when the container is closed. In other embodiments edges of the top enclosure and bottom enclosure may not be fully in contact even when the container is closed, to enable flaps for opening or other structures with holes or attachment elements as one skilled in the art will recognize. Attached to the front edge of bottom enclosure 102 is bottom press-fit element 232. In the embodiment shown, the press-fit elements extend forward from the front edges of the enclosure halves. In other embodiments these press-fit elements may be oriented differently; for example in some embodiments they may extend backwards from the front edges of the top and bottom enclosures. The specific location of the press-fit elements may be varied as long as they are able to mate together to seal the container. In some embodiments the press-fit elements may extend from the front edge to portions of the left or right edges of the top and bottom enclosures.

In the embodiment shown in FIG. 2, the top enclosure 101 and bottom enclosure 102 have curved shapes so that when they are joined together there is an inner volume enclosed by the container. In some embodiments the materials and shape of the enclosures may be sufficiently rigid that this volume is present even when the container is empty. In other embodiments the materials and shape may be more flexible, such that the top and bottom enclosures collapse against one another, as in a thin plastic bag, when the container is empty.

Figure 3:
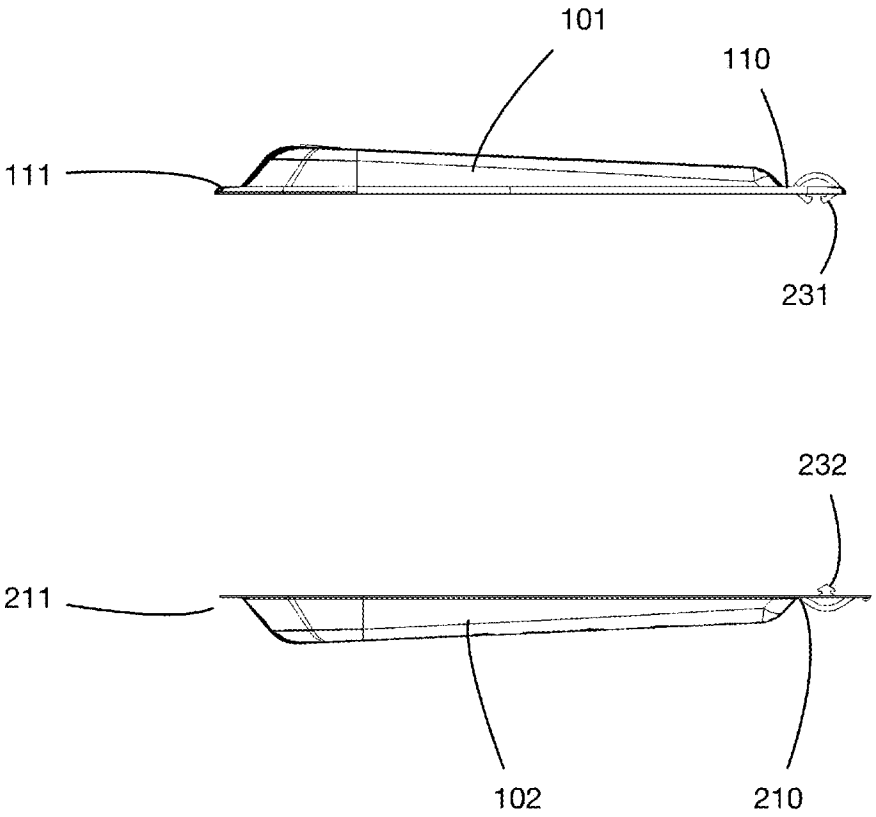
FIG. 3 shows a side view of the top and bottom enclosures and top and bottom press-fit elements of FIG. 2.

FIG. 3 shows a side view of the embodiment shown in FIGS. 1 and 2, with the top enclosure 101 and bottom enclosure 102 shown separately. This side view shows more clearly that the top press-fit element 231 and the bottom press-fit element 232 are shaped and oriented to fit together to provide a seal for the container. In this embodiment bottom press-fit element 232 has a protrusion with a triangular top that extends upward and that fits into a corresponding recess in top press-fit element 231. Other embodiments may employ different shapes for the top and bottom press-fit elements.

Figure 4:
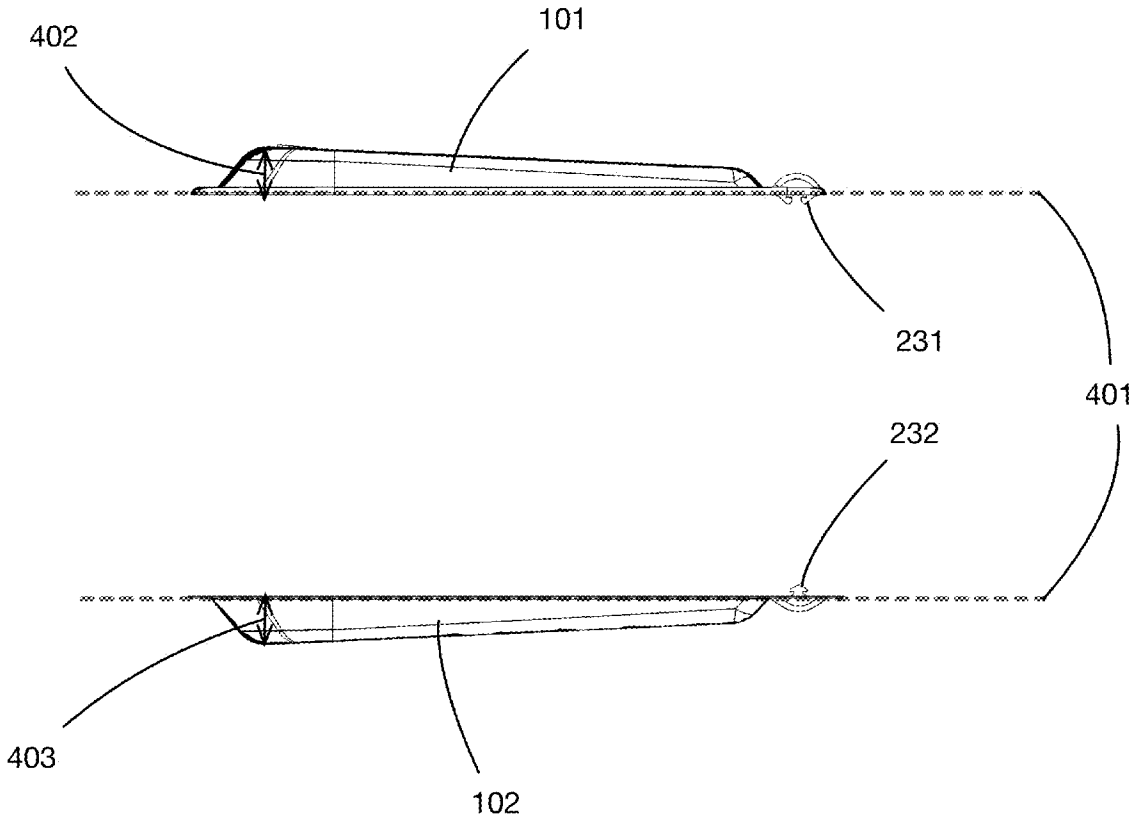
FIG. 4 shows a side view of the enclosures and press-fit elements from FIG. 3 relative to the center horizontal plane.

FIG. 4 shows an annotated view of FIG. 3. Center horizontal plane 401, running in this embodiment along the front-to-back axis, is the plane along which top enclosure 101 and bottom enclosure 102 are joined. In this embodiment the edges of the top enclosure 101 are located on the plane 401, as are the edges of the bottom enclosure 102. In other embodiments different shapes may be used so that edges need not all lie on a common plane. Portions of the top press-fit element 231 extend below plane 401 in this embodiment, and portions of the bottom press-fit element 232 extend above plane 401 in this embodiment. In other embodiments one or more of the press-fit elements may lie entirely on one side of the center horizontal plane. FIG. 4 also shows that top enclosure 101 has a height 402 of its enclosed volume above the horizontal plane 401, and that bottom enclosure 102 has a height 403 of its enclosed volume below the horizontal plane 401. In this embodiment the top enclosure and the bottom enclosure are approximately mirror images of one another across the center horizontal plane. Other embodiments may employ other shapes, including shapes that are not mirror images or that do not have flat edges on a common horizontal plane. Different embodiments may provide various sizes and shapes for the volume enclosed by the container when it is closed.

Figure 5:
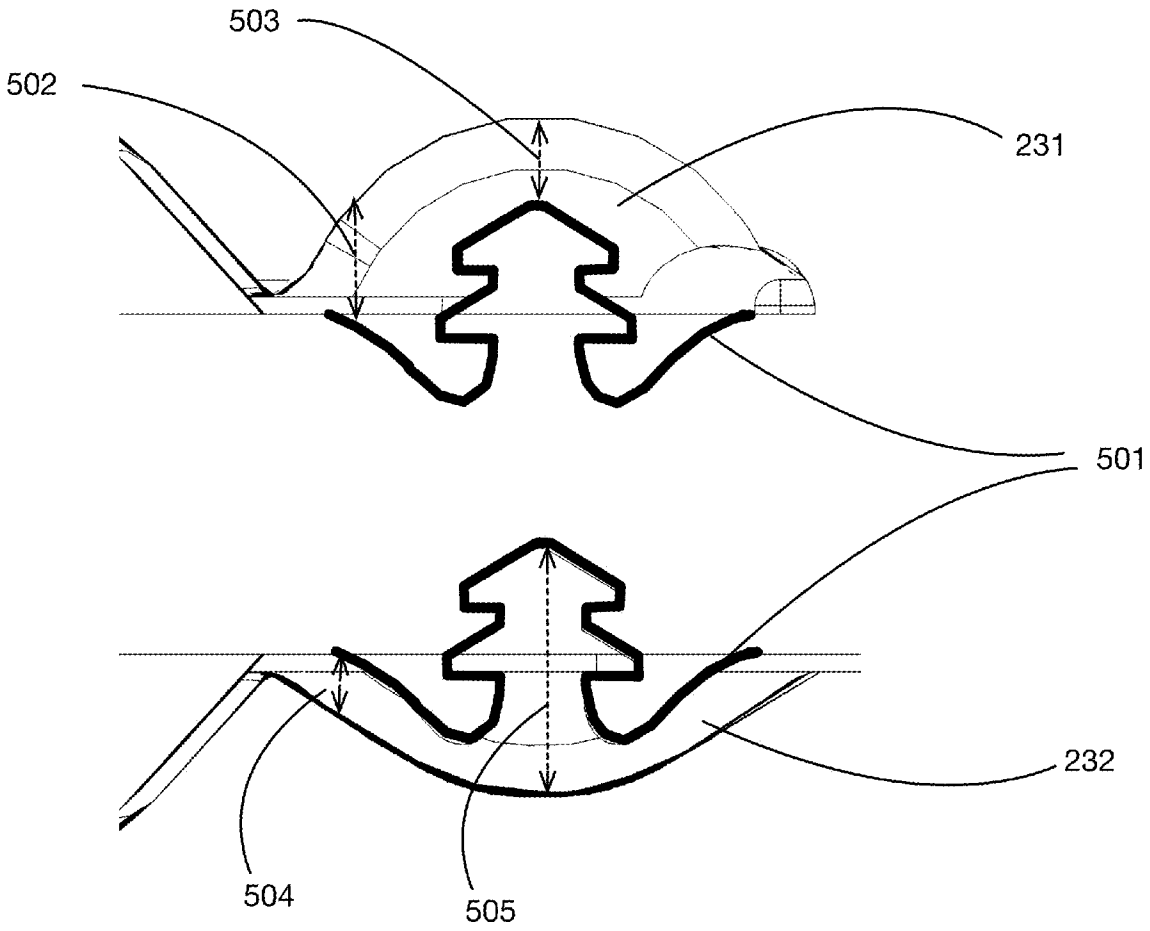
FIG. 5 illustrates a side view of the top and bottom press-fit elements of an embodiment of the invention, with their common boundary for example as shown with bold lines.

FIG. 5 shows a close up side view of the top press-fit element 231 and bottom press-fit element 232 of the embodiment shown in FIG. 4. When closed and sealed, the press-fit elements meet at a common boundary 501. In the embodiment shown, the bottom press-fit element has a center vertical protrusion with a groove on either side of the protrusion. The top press-fit element has a corresponding recess to accept the protrusion, and has protrusions extending downward to fit into the grooves of the bottom press-fit element. The thickness of the material of the press-fit elements is a significant factor contributing to the strength of the seal. In the embodiment shown in FIG. 5, the thickness varies across the press-fit elements. For example, near the back edge of the press-fit elements, bottom press-fit element has an edge thickness 504 and top press-fit element has an thickness 502. In the center of the bottom protrusion, bottom press-fit element has a center thickness 505 and top press-fit element has a center thickness 503. In one or more embodiments, the average material thickness of the top and bottom press-fit elements is at least 0.25 cm, in other embodiments, any value up to 0.5 cm, in other embodiments any value between 0.5 cm and 0.75 cm and in other embodiments 1.0 cm across their common boundary 501. Material thickness at or in excess of these ranges can contribute to forming a leak-resistant seal when the enclosure is closed and sealed. For example, in one embodiment with average thickness of press-fit elements of about 0.8 cm, experiments have demonstrated a seal sufficient to contain 1 to 2 cups of water without leakage even when the container is held upside down (with the front facing downward) so that the water exerts pressure against the seal.

Figure 6:
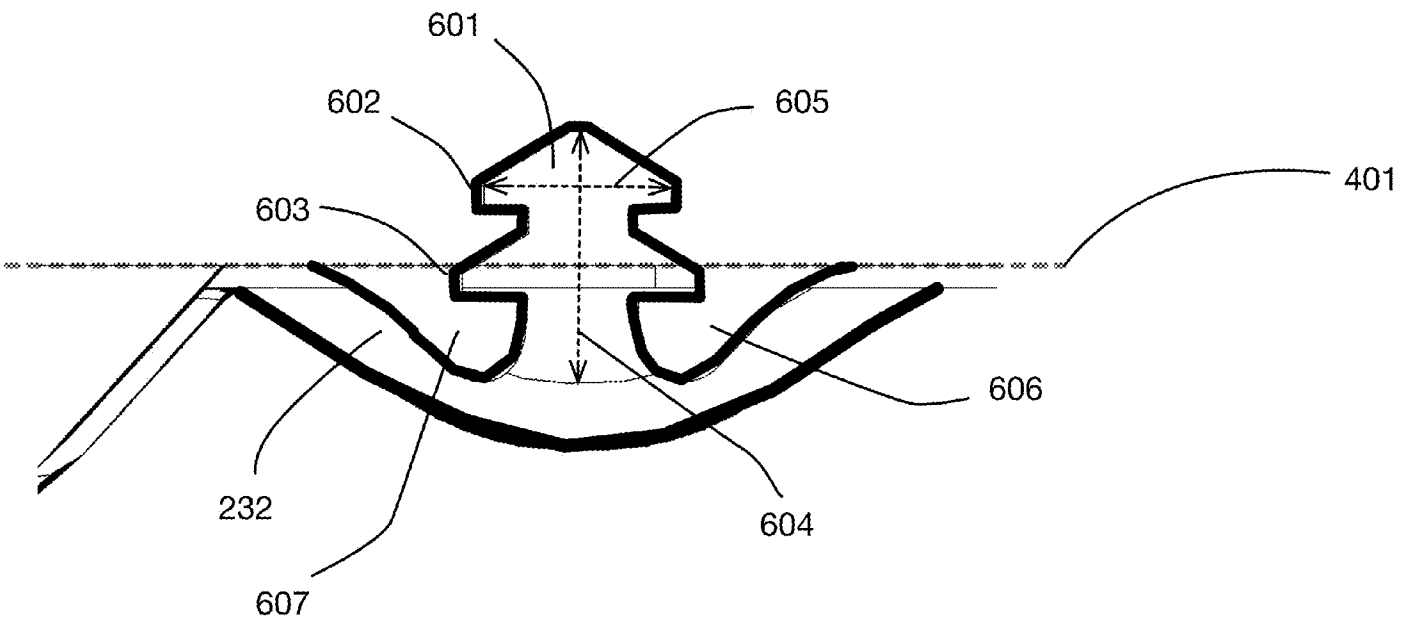
FIG. 6 illustrates detailed features of the lower press-fit element of an embodiment of the invention.

In some embodiments, the shapes and dimensions of the press-fit elements may also contribute significantly to the leak resistance of the seal. FIG. 6 illustrates details of the bottom-press fit element 232 of the embodiment shown in FIG. 5. In this embodiment, vertical protrusion 601 extends upward from the bottom press-fit element, while cavities 606 and 607 are on either side of this vertical protrusion. Other embodiments may have different numbers and shapes of protrusions and cavities, configured as male elements and female elements that fit together when the seal of the container is closed. In some embodiments a main vertical protrusion, like protrusion 601, may be located on the top press-fit element, rather than on the bottom press-fit element as in FIG. 6. As shown, the vertical protrusion is symmetrical, however, any asymmetrical shape may also be utilized so long as the seal is shaped for the desired leak resistance of the given implementation.

In the embodiment shown in FIG. 6, vertical protrusion 601 has two horizontal ridges 602 and 603 extending horizontally outward from the vertical protrusion. These ridges have triangular sloped upper surfaces to facilitate insertion into the corresponding cavities in the upper press-fit element. They also have flat horizontal lower surfaces that provide resistance to opening once the protrusion is inserted into the upper cavities. Other embodiments may have vertical protrusions with only one horizontal ridge, or with more than two horizontal ridges. In some embodiments vertical protrusions may have no horizontal ridges and other features of the shape or material of the press-fit elements may provide sufficient sealing force.

In the embodiment shown in FIG. 6, vertical protrusion 601 extends above the center horizontal plane 401, and cavities 606 and 607 extend below the center horizontal plane 401. This arrangement of the components of the press-fit element has the effect of centering the sealing elements relative to the top and bottom enclosures. Such a design may have a significant benefit for embodiments with relatively thick material in the press-fit elements, since otherwise the seal would potentially extend far above or below the outer surfaces of the top or bottom enclosures. For comparison, very thin plastic bags may have sealing elements that include a protrusion extending entirely above one side of the bag, with no corresponding cavities below that side of the bag. Such a design may be acceptable with very thin sealing elements, but such seals may not be as leak resistant as seals with thicker material.

The vertical protrusion 601 in FIG. 6 has vertical height 604 above the cavities 606 and 607, and the horizontal ridge 602 has width (measured back to front) of 605. In one or more embodiments of the invention, one or more vertical protrusions have height 604 of at least 0.2 cm, e.g., 80%, or any other percentage of the overall thickness of the upper and lower press-fit elements, in other embodiments, any value between 0.4 cm and 0.6 and in other embodiments 0.8 cm. In other embodiments, one or more horizontal ridges extending from a vertical protrusion have width 605 of at least 0.1 cm wide or any other width, including any value greater than 0.1 cm, such as 0.2 cm or wider. Dimensions such as these exemplary values may contribute to a higher sealing force that causes the container to be leak resistant. Some embodiments may have a plurality of vertical protrusions or a plurality of horizontal ridges that provide sufficient aggregate sealing force even though individual vertical protrusions and horizontal ridges are below these exemplary dimensions. In one or more embodiments, the width of the seal may be varied to provide a higher or lower leak resistance capability.

Figure 7:
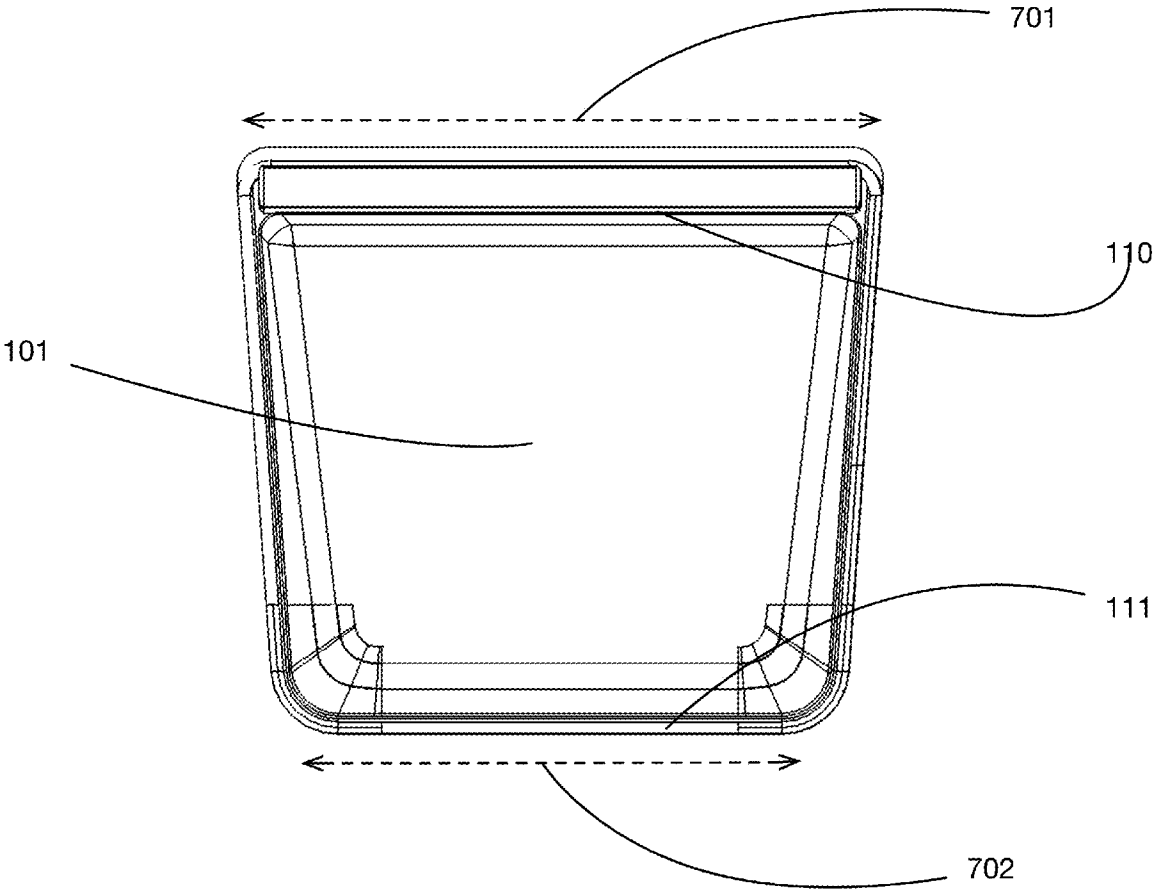
FIG. 7 illustrates a top view of an embodiment of the invention in which the front edge is longer than the back edge.

FIG. 7 illustrates at top-view of an embodiment of the invention with top enclosure 101 shown. In this embodiment the length 701 of front edge 110 is larger than the length 702 of back edge 111. The edges of top enclosure 101 therefore form roughly a trapezoid, rather than a rectangle. Such an embodiment offers the potential advantage that it is easier to place items into the opening of the container, or remove them from the container, because the opening along the front edge 110 is larger. Such a design may be particularly beneficial when the sealing elements are larger and thicker, since larger and thicker sealing elements may tend to pinch together at the left and right edges.

FIG. 8 illustrates a close up side view of the top and bottom press-fit elements of another embodiment of the invention. In this embodiment bottom press-fit element 232 has a vertical protrusion 601 and cavities 606 and 607 on either side of the vertical protrusion. This basic structure is similar to that of the embodiment shown in FIG. 6. However in the embodiment of FIG. 8, the vertical cavity 607 towards the back has depth 801 below center horizontal plane 401 that is greater than the depth 802 of the vertical cavity 606 towards the front. This asymmetry offers the potential advantage of reducing the amount of force needed to begin opening the seal from the front, while maintaining a deeper cavity towards the back to resist pressure from inside the container pressing against the seal. It therefore contributes to the leak resistance of the seal while mitigating the effect of this leak resistance on the force required by a user to open the container. Other embodiments may provide other asymmetric shapes with different arrangements and dimensions of cavities and protrusions to accomplish the same objective of a strong seal with a mitigated opening force.

Embodiments of the invention provide opposing surfaces of the top press-fit element and the bottom press-fit element to resist forces in multiple directions. These opposing surfaces in multiple directions contribute to the strength of the seal and the resistance of the seal to leaks. In one or more embodiments, opposing forces between the top and bottom press-fit elements exist in each of the four directions up, down, forward and backward (when viewed from a side view). In some embodiments the directions of opposing forces exist in all four quadrants of the plane perpendicular to the front edge, but may not be precisely along the vertical and horizontal axes. Such embodiments effectively provide opposing forces in all four directions since the vector sum of the actual forces includes components in the positive and negative vertical and horizontal directions.

In one or more embodiments, multiple segments of the common boundary provide resistance to forces in each direction. With multiple segments providing force resistance in various directions, the strength of the seal may be further increased.

Figure 9:
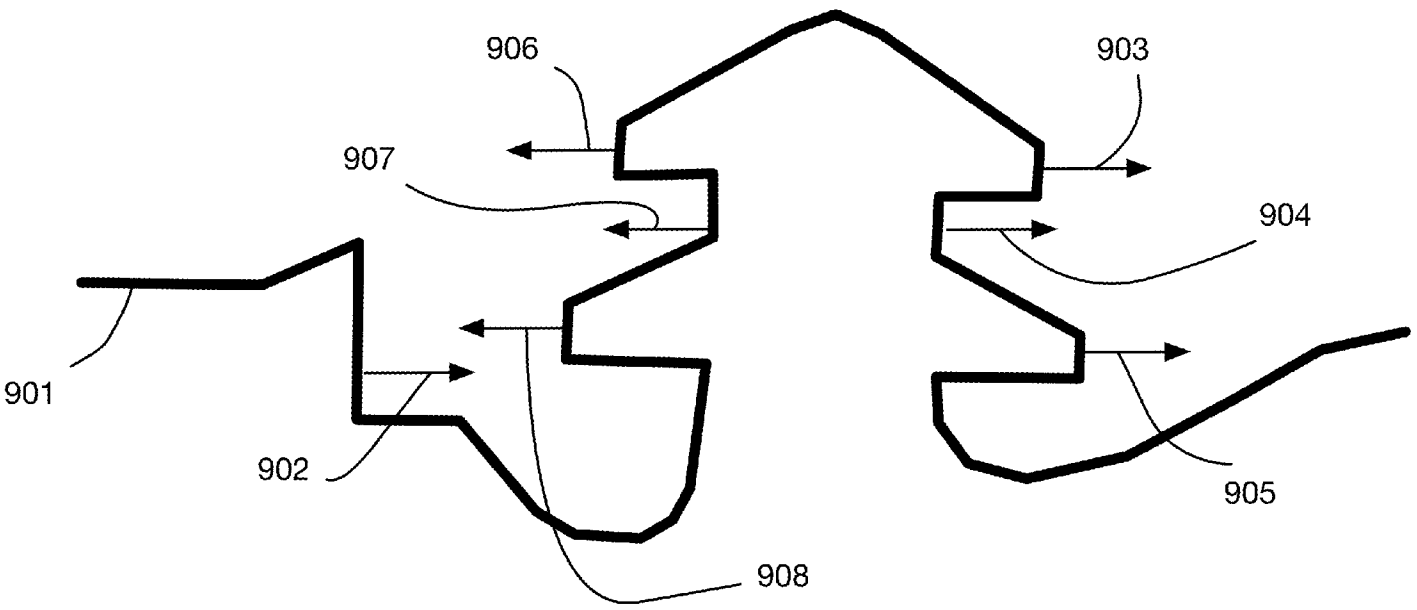
FIG. 9 illustrates the press-fit boundary of the embodiment of the invention shown in FIG. 8, along with horizontal normal vectors to the boundary.

The directions of the opposing forces between the top press-fit element and the bottom press-fit element are represented by the normal vectors to the common press-fit boundary between the top and bottom press-fit elements. FIG. 9 illustrates this boundary 901 for the embodiment of the invention shown in FIG. 8. In FIG. 9 several horizontal normal vectors are shown for this boundary. Normal vectors 902, 903, 904, and 905 are horizontal towards the front. Normal vectors 906, 907, and 908 are horizontal towards the back. In this embodiment, there are at least 4 normal vectors in the horizontal front direction, each on a different segment of the boundary, and there are at least 3 normal vectors in the horizontal back direction, each on a different segment of the boundary.

Figure 10:
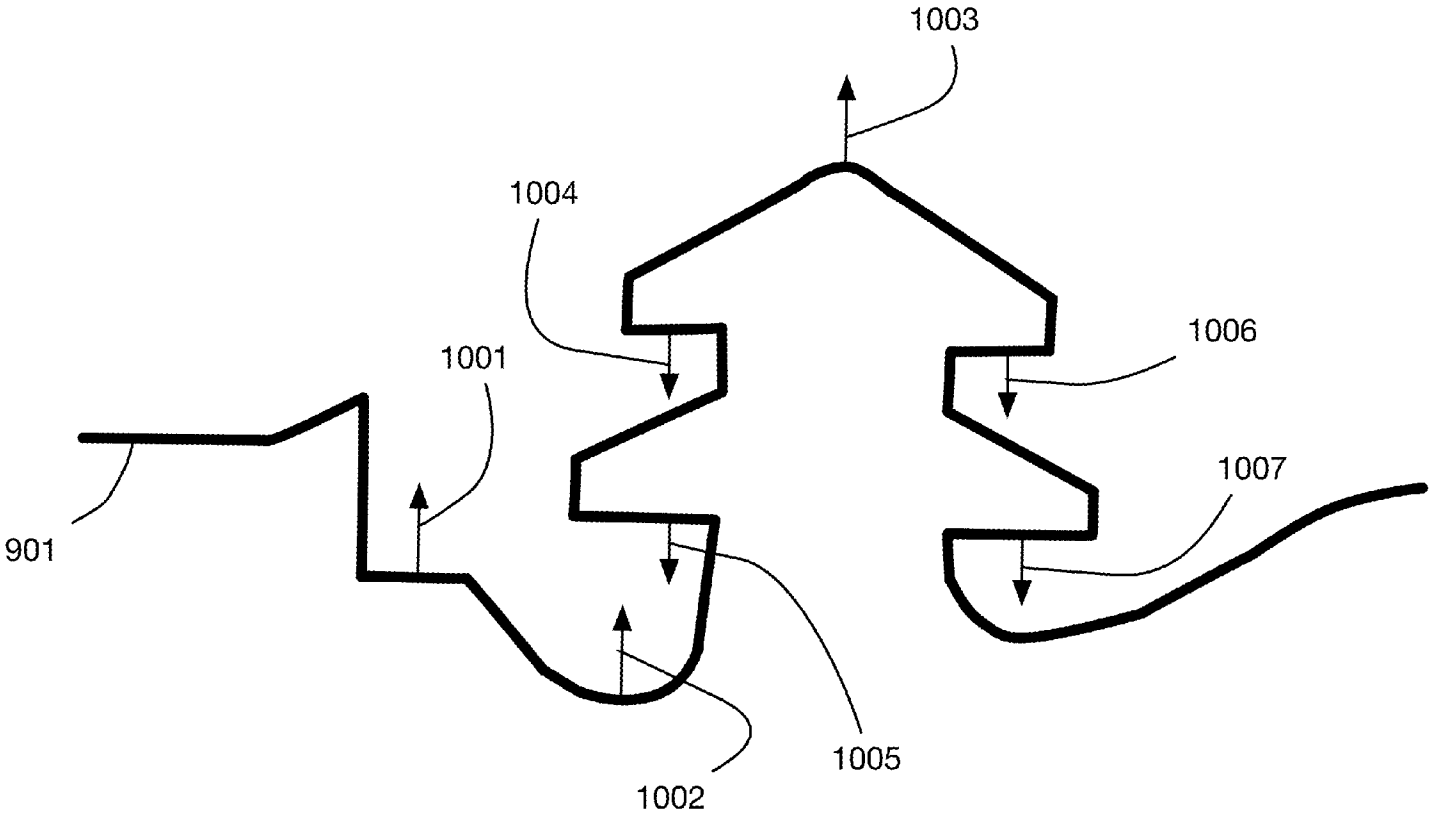
FIG. 10 illustrates the press-fit boundary of the embodiment of the invention shown in FIG. 8, along with the vertical normal vectors to the boundary.

FIG. 10 illustrates vertical normal vectors for the embodiment shown in FIG. 9. In this embodiment, normal vectors 1001, 1002, and 1002 are vertical pointing upwards, and normal vectors 1004, 1005, 1006, and 1007 are vertical pointing downwards. Thus in this embodiment there are at least 3 normal vectors in the vertical up direction, each on a different segment of the boundary, and there are at least 4 normal vectors in the vertical down direction, each on a different segment of the boundary.

FIGS. 9 and 10 illustrate an exemplary embodiment of the invention with at least 3 different segments of the boundary having normal vectors in each of the directions forward, backward, up, and down. The embodiment shown has a winding boundary that changes direction multiple times to provide the forces in each direction. Other embodiments of the invention provide only a single segment for the normal vector in each of the four directions, or may provide more than 3 segments for the normal vector in each of the four directions. In some embodiments, there may be more segments providing normal vectors to forces in horizontal directions to increase the seal's resistance to horizontal pressure. Different embodiments of the invention may employ boundary path shapes optimized for the forces expected for the application of the container for this embodiment. In various embodiments the segments of the boundary may be flat, pointed, curved, segmented, or any combination thereof as appropriate for the application.

Figure 11:
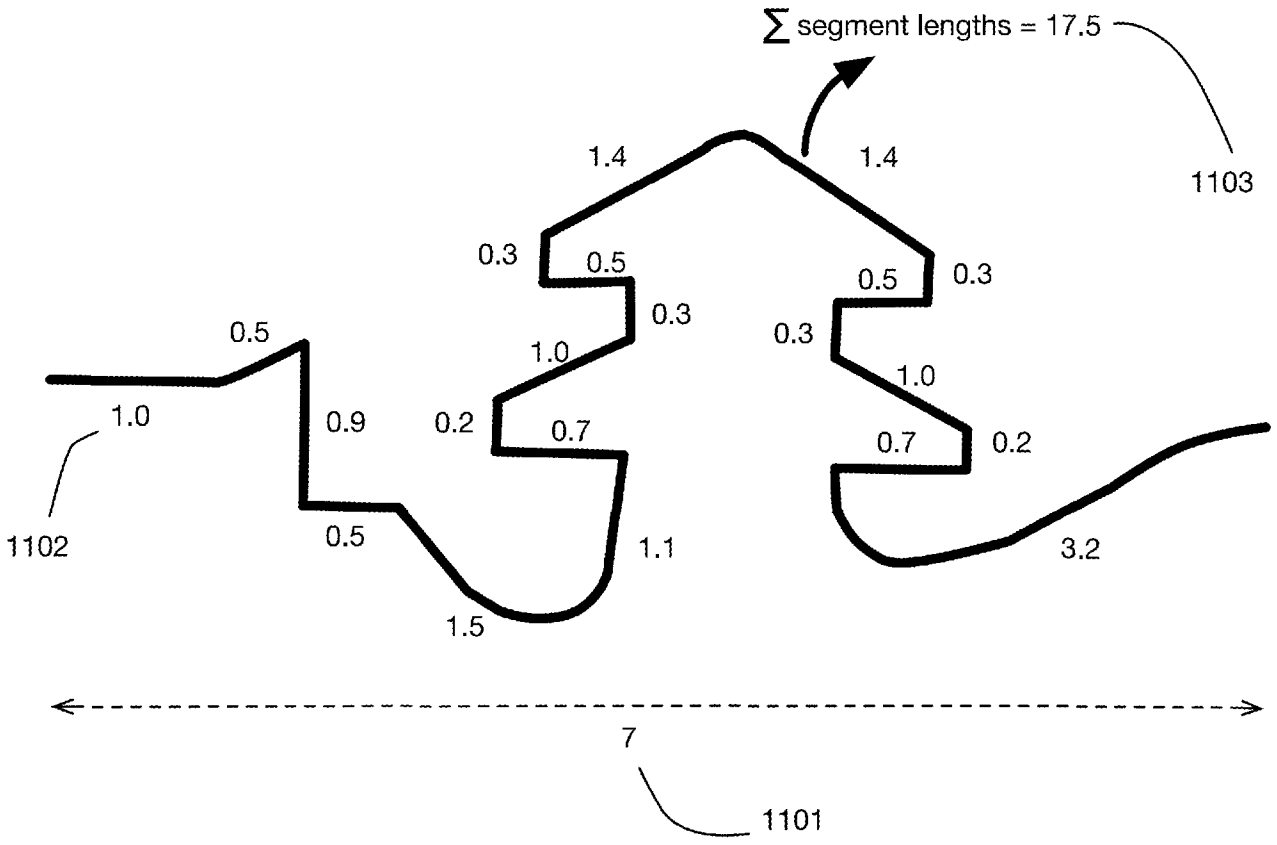
FIG. 11 illustrates the press-fit boundary of the embodiment of the invention shown in FIG. 8, along with the path length of the boundary.

One or more embodiments of the invention provide leak resistance in part by utilizing a winding path for the boundary between the top press-fit element and the bottom press-fit element. When the seal is closed, liquids flowing through gaps in the seal must traverse this entire winding path. *Such a gap is shown at gap 819 having horizontal width G1 between first boundary of contact having horizontal width B1, starting at contact point 820 when traversing the seal from left to right up to contact point 821* (*where the gap begins*) *and second boundary of contact having horizontal width B2, starting at contact point 822* (*where the gap ends*) *when traversing the seal from left to right up to contact point 823.* Hence a longer and more tortuous path increases the leak resistance of the seal. Different embodiments may employ various shapes for such a winding path. FIG. 11 illustrates the boundary path for the embodiment shown in FIG. 8. The relative length of the different segments of the boundary are shown in FIG. 11; for example the leftmost horizontal segment has length 1102 of 1.0. (The lengths shown are only relative to one another; they are not expressed in any specific units.) In the embodiment shown, the total length 1103 of the winding boundary path is 17.5. The horizontal distance 1101 between the start and end of the path is 7.0. Thus the path length is approximately 2.5 times the horizontal distance. This ratio of path length to horizontal distance is a quantification of the extent to which the boundary path winds and changes directions, which contributes to the sealing force and the leak resistance. Some embodiments of the invention, such as the one shown in FIG. 11, have a boundary path length of at least twice the horizontal distance between the start and end of the path.

Some embodiments of the invention utilize multiple techniques to enhance the leak resistance of the seal. For example, the embodiment shown in FIG. 8 provides a winding boundary path of length more than twice the horizontal distance, as well as three or more normal vectors in each of the four directions up, down, backward, and forward. In some embodiments such techniques may be combined with a high average material thickness or other dimensional or material variations for the press-fit elements to further increase the leak resistance.

In one or more embodiments of the invention, the press-fit elements of the seal may extend to portions of the left edge or the right edge, or both, of the top and bottom enclosures. FIG. 12 illustrates an embodiment in which the press-fit elements are located along the front edges and also along the front portions of the left and right edges. FIG. 12 shows an exploded view of the top enclosure 101 and bottom enclosure 102. In this embodiment top press-fit element 231 has portion 1201 that is proximal to left side 112, and portion 1202 that is proximal to right side 113. Similarly bottom press-fit element 232 has portion 1203 that is proximal to left side 212 and portion 1204 that is proximal to right side 213. In the embodiment shown, the press-fit elements curve around the corners between the front edge and the left and right edges. In other embodiments the press-fit elements may form right angles at the corners, or may form any curved or polygonal shape to extend from the front edge to the left and right edges. Embodiments may employ curved shapes for the corners that may be circular, oval, elliptical, or any other shape. Embodiments may employ polygon shapes for the corners that may be rectangular, or they may use multiple segments with any angles between the segments. In some embodiments the press-fit elements may extend to only one of the left or right edges. A potential advantage of embodiments in which the press-fit elements extend to the left and right edges is that the opening of the container may be wider, simplifying insertion or removal of objects.

Figure 13:
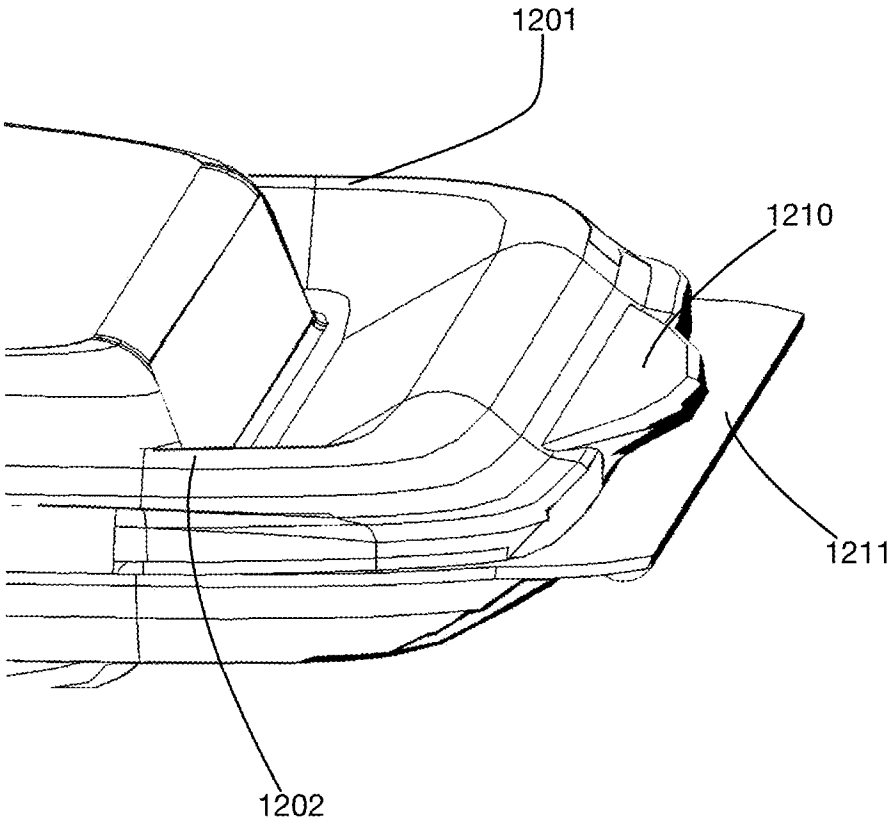
FIG. 13 shows a close up view of the front of the embodiment shown in FIG. 12.

In one or more embodiments of the invention, the container may include a top flap or a bottom flap, or both, proximal to the opening. These flaps may be used for example for grasping the edges of the container when opening or closing the container. FIG. 12 illustrates an embodiment of the invention with a top flap 1210 and a bottom flap 1211. In some embodiments the shapes and sizes of the top flap and the bottom flap, if both are present, may be different. This is illustrated in FIG. 12 where top flap 1210 forms an arc extending from approximately the middle third of the top front edge, while bottom flap 1211 extends along the entire bottom front edge. FIG. 13 shows a close up view of the front of the embodiment illustrated in FIG. 12, shown in the closed position. As illustrated in FIG. 13, in this embodiment the bottom flap 1211 extends further forward than top flap 1210. Embodiments that employ flaps of different sizes may facilitate opening by making it easier for a user to grasp one of the flaps to begin opening. Different embodiments may use different sizes and shapes of flaps, including symmetric designs with similar shapes for top and bottom flaps, and asymmetric designs as illustrated in FIG. 13.

FIG. 14 illustrates an embodiment of the invention with a vertical gap between the top flap and the bottom flap, to facilitate grasping the flaps for opening. In this embodiment top flap 1210 has a curved form that is vertically offset from bottom flap 1211 by distance 1401. This shape may make it easier for a user to insert his or her fingers into the space between the flaps. In this embodiment bottom flap 1211 has a series of ridges running parallel to the front edge of the container, to aid in grasping the flap. In the embodiment shown in FIG. 14, the press-fit elements are located along the front edges and also along the front portions of the left and right edges. Top press-fit element 231 has portion 1201 that is proximal to left side 112, and portion 1202 that is proximal to right side 113. Similarly the bottom press-fit element extends to the left edge and the right edge. In this embodiment, the press-fit elements curve around the corners between the front edge and the left and right edges.

While the ideas herein disclosed have been described by means of specific embodiments and applications thereof, numerous modifications and variations could be made thereto by those skilled in the art without departing from the scope of the invention set forth in the claims.

[What is claimed is]*We claim*:

1. A shaped elastomeric container with an integrated leak resistant seal, wherein the shaped elastomeric container comprises:

[an elastomer;]

a top enclosure and a bottom enclosure comprising [said] *an* elastomer, said top enclosure located on or above a center horizontal plane, said bottom enclosure located on or below said center horizontal plane, wherein said top enclosure and said bottom enclosure are configured to provide an inner volume of said shaped elastomeric container, and wherein each of said top enclosure and said bottom enclosure comprises:

a front edge configured to move to provide access to said inner volume, a back edge opposite said front edge, a left edge, and a right edge opposite said left edge; and said top enclosure is coupled to said [lower] *bottom* enclosure along portions of one or more of said back edge, said left edge, said right edge, and said front edge;

a leak resistant seal configured to open and close said shaped elastomeric container, comprising:

a bottom press-fit element proximal to said front edge of said bottom enclosure;

a top press-fit element proximal to said front edge of said top enclosure;

wherein an upper surface of said bottom press-fit element corresponds with a lower surface of said top press-fit element, such that said upper surface and said lower surface are in contact at a boundary when said shaped elastomeric container is closed;

[the] *an* average thickness of said bottom press-fit element across said boundary is at least 0.25 cm; and,

[the] *an* average thickness of said top press-fit element across said boundary is at least 0.25 cm, wherein said leak resistant seal is integrated into said shaped elastomeric container, wherein said bottom press-fit element is located opposite to said top press-fit element, wherein one or both of said bottom press-fit element and said top press-fit element comprise a vertical protrusion with one or more vertically offset ridges extending horizontally from said vertical protrusion, wherein said one or more vertically offset ridges on one or both of said bottom press-fit element and said top press-fit element lock into place into corresponding indentations on the opposite of one or more of said bottom press-fit element and said top press-fit element, and, wherein said top press-fit element and said bottom press-fit element mate together to seal said shaped elastomeric container, *and,*

*wherein the top enclosure, the bottom enclosure, the top press fit element, and the bottom press fit element are entirely comprised of the elastomer.*

2. The shaped elastomeric container with an integrated leak resistant seal of claim 1, wherein said leak resistant seal is configured as a handle configured to hold said shaped elastomeric container.

3. The shaped elastomeric container with an integrated leak resistant seal of claim 1, wherein a width of said front edge, measured from said left edge to said right edge, is greater than a width of said back edge, measured from said left edge to said right edge.

4. The shaped elastomeric container with an integrated leak resistant seal of claim 1, wherein one or both of said bottom press-fit element and said top press-fit element further comprise at least one male or at least one female element or wherein said one or more vertically offset ridges comprise a plurality of vertically offset ridges extending horizontally from said vertical protrusion.

5. The shaped elastomeric container with an integrated leak resistant seal of claim 1, wherein said elastomer [is] *comprises only* silicone.

6. The shaped elastomeric container with an integrated leak resistant seal of claim 1, wherein a height of said vertical protrusion is at least 0.2 cm and a width measured back to front of one of said one or more vertically offset ridges is at least 0.1 cm.

7. The shaped elastomeric container with an integrated leak resistant seal of claim 1, wherein said upper surface of said bottom press-fit element comprises one or more cavities that extend below said center horizontal plane and one or more protrusions that extend above said center horizontal plane.

8. The shaped elastomeric container with an integrated leak resistant seal of claim 1, wherein said top press-fit element and said bottom press-fit element extend to portions of said left edge or said right edge or both said left edge and said right edge.

9. The shaped elastomeric container with an integrated leak resistant seal of claim 1, further comprising a top flap extending forward from said top press-fit element, and a bottom flap extending forward from said bottom press-fit element, wherein said top flap or said bottom flap or both said top flap and said bottom flap extend forward of said front edge.

10. The shaped elastomeric container with an integrated leak resistant seal of claim 9, wherein said top flap extends further forward than said bottom flap, or said bottom flap extends further forward than said top flap.

11. The shaped elastomeric container with an integrated leak resistant seal of claim 1, wherein one or both of said bottom press-fit element and said top press-fit element further comprise:

a back vertical cavity located between said vertical protrusion and [the] *a* back of said boundary; and a front vertical cavity located between said vertical protrusion and [the] *a* front of said boundary;

wherein a vertical depth of said back vertical cavity is greater than a vertical depth of said front vertical cavity.

12. A shaped elastomeric container with an integrated leak resistant seal, wherein the shaped elastomeric container comprises:

[an elastomer;]

a top enclosure and a bottom enclosure comprising [said] *an* elastomer, said top enclosure located on or above a center horizontal plane, said bottom enclosure located on or below said center horizontal plane, wherein said top enclosure and said bottom enclosure are configured to provide an inner volume of said shaped elastomeric container, and wherein each of said top enclosure and said bottom enclosure comprises:

a front edge configured to move to provide access to said inner volume, a back edge opposite said front edge, a left edge, and a right edge opposite said left edge;

said top enclosure is coupled to said [lower] *bottom* enclosure along portions of one or more of said back edge, said left edge, said right edge, and said front edge;

a leak resistant seal configured to open and close said shaped elastomeric container, comprising:

a bottom press-fit element proximal to said front edge of said bottom enclosure;

a top press-fit element proximal to said front edge of said top enclosure;

wherein an upper surface of said bottom press-fit element corresponds with a lower surface of said top press-fit element, such that said upper surface and said lower surface are in contact at a boundary when said shaped elastomeric container is closed;

a cross-sectional profile of said boundary in [the] *a* plane perpendicular to said front edge comprises a winding path wherein said winding path comprises four points at which a normal vector to said winding path is respectively in four directions comprising an up direction, a down direction, a front direction, and a back direction; and, a length of said winding path is at least two times a horizontal distance between a start of said winding path and an end of said winding path measured on an axis from back to front, wherein said leak resistant seal is integrated into said shaped elastomeric container, wherein said bottom press-fit element is located opposite to said top press-fit element, wherein one or both of said bottom press-fit element and said top press-fit element comprise a vertical protrusion with one or more vertically offset ridges extending horizontally from said vertical protrusion, wherein said one or more vertically offset ridges on one or both of said bottom press-fit element and said top press-fit element lock into place into corresponding indentations on the opposite of one or more of said bottom press-fit element and said top press-fit element, and, wherein said top press-fit element and said bottom press-fit element mate together to seal said shaped elastomeric container*, and,*

*wherein the top enclosure, the bottom enclosure, the top press fit element, and the bottom press fit element are entirely comprised of the elastomer*.

13. The shaped elastomeric container with an integrated leak resistant seal of claim 12, wherein said winding path comprises:

three or more points on different segments of said winding path at which the normal vector to said winding path is in the up direction;

three or more points on different segments of said winding path at which the normal vector to said winding path is in the down direction;

three or more points on different segments of said winding path at which the normal vector to said winding path is in the front direction;

three or more points on different segments of said winding path at which the normal vector to said winding path is in the back direction.

14. The shaped elastomeric container with an integrated leak resistant seal of claim 12, wherein said elastomer [is] *comprises only* silicone.

15. The shaped elastomeric container with an integrated leak resistant seal of claim 12, wherein said upper surface of said bottom press-fit element comprises one or more cavities that extend below said center horizontal plane and one or more protrusions that extend above said center horizontal plane.

16. The shaped elastomeric container with an integrated leak resistant seal of claim 12, wherein a width of said front edge, measured from said left edge to said right edge, is greater than a width of said back edge, measured from said left edge to said right edge.

17. The shaped elastomeric container with an integrated leak resistant seal of claim 12, wherein said top press-fit element and said bottom press-fit element extend to portions of said left edge or said right edge or both said left edge and said right edge.

18. The shaped elastomeric container with an integrated leak resistant seal of claim 12, further comprising a top flap extending forward from said top press-fit element, and a bottom flap extending forward from said bottom press-fit element, wherein said top flap extends further forward than said bottom flap, or said bottom flap extends further forward than said top flap.

19. The shaped elastomeric container with an integrated leak resistant seal of claim 12, wherein one or both of said bottom press-fit element and said top press-fit element further comprise:

a back vertical cavity located between said vertical protrusion and [the] *a* back of said boundary; and a front vertical cavity located between said vertical protrusion and [the] *a* front of said boundary; and wherein a vertical depth of said back vertical cavity is greater than a vertical depth of said front vertical cavity.

20. A shaped elastomeric container with an integrated leak resistant seal, wherein the shaped elastomeric container comprises:

[an elastomer;]

a top enclosure and a bottom enclosure comprising [said] *an* elastomer, said top enclosure located on or above a center horizontal plane, said bottom enclosure located on or below said center horizontal plane, wherein said top enclosure and said bottom enclosure are configured to provide an inner volume of said shaped elastomeric container, and wherein each of said top enclosure and said bottom enclosure comprises:

a front edge configured to move to provide access to said inner volume, a back edge opposite said front edge, a left edge, and a right edge opposite said left edge;

said top enclosure is coupled to said [lower] *bottom* enclosure along portions of one or more of said back edge, said left edge, said right edge, and said front edge;

a width of said front edge, measured from said left edge to said right edge, is greater than a width of said back edge, measured from said left edge to said right edge;

a leak resistant seal configured to open and close said shaped elastomeric container, comprising:

a bottom press-fit element proximal to said front edge of said bottom enclosure;

a top press-fit element proximal to said front edge of said top enclosure;

wherein an upper surface of said bottom press-fit element corresponds with a lower surface of said top press-fit element, such that said upper surface and said lower surface are in contact at a boundary when said shaped elastomeric container is closed;

an average thickness of said bottom press-fit element across said boundary is at least 0.25 cm;

an average thickness of said top press-fit element across said boundary is at least 0.25 cm;

a cross-sectional profile of said boundary in a plane perpendicular to said front edge comprises a winding path wherein said winding path comprises four points at which a normal vector to said winding path is respectively in four directions comprising an up direction, a down direction, a front direction, and a back direction; and a length of said winding path is at least two times a horizontal distance between a start of said winding path and an end of said winding path measured on an axis from back to front;

said upper surface of said bottom press-fit element comprises one or more cavities that extend below said center horizontal plane and one or more protrusions that extend above said center horizontal plane;

said leak resistant seal is integrated into said shaped elastomeric container, said bottom press-fit element is located opposite to said top press-fit element, one or both of said bottom press-fit element and said top press-fit element comprise:

a vertical protrusion with a plurality of vertically offset ridges extending horizontally from said vertical protrusion, wherein said plurality of vertically offset ridges on one or both of said bottom press-fit element and said top press-fit element lock into place into corresponding indentations on the opposite of one or more of said bottom press-fit element and said top press-fit element;

a back vertical cavity located between said vertical protrusion and [the] *a* back of said boundary; and a front vertical cavity located between said vertical protrusion and [the] *a* front of said boundary; and, wherein a vertical depth of said back vertical cavity is greater than a vertical depth of said front vertical cavity; and, a top flap extending forward from said top press-fit element, and a bottom flap extending forward from said bottom press-fit element, wherein said top flap extends further forward than said bottom flap, or said bottom flap extends further forward than said top flap,

*wherein the top enclosure, the bottom enclosure, the top press fit element, and the bottom press fit element are entirely comprised of the elastomer.*

*21. The shaped elastomeric container of claim 1 wherein said top enclosure and said bottom enclosure are formed together and coupled to one another within a mold.*

*22. The shaped elastomeric container of claim 1 wherein said top enclosure is coupled to said bottom enclosure with said elastomer.*

*23. The shaped elastomeric container of claim 1 wherein said top enclosure is coupled to said bottom enclosure via integrated molding.*

*24. The shaped elastomeric container of claim 1 wherein said top enclosure and said bottom enclosure are formed together within a mold and wherein said top enclosure is coupled to said bottom enclosure with said elastomer.*

*25. The shaped elastomeric container of claim 1 wherein said top enclosure and said bottom enclosure are formed together within a mold and wherein said top enclosure is coupled to said bottom enclosure via integrated molding.*

*26. The shaped elastomeric container of claim 1 wherein said top enclosure and said bottom enclosure are formed together within a mold and wherein said top enclosure is coupled to said bottom enclosure with said elastomer via integrated molding.*

*27. The shaped elastomeric container of claim 1 wherein said top enclosure and said bottom enclosure are designations of two parts or two portions of said shaped elastomeric container formed as one component wherein said top enclosure and said bottom enclosure are located on or above said center horizontal plane and on or below said center horizontal plane respectively.*

*28. The shaped elastomeric container of claim 1 wherein one or more of said back edge, said left edge, said right edge are continuous between said top enclosure and said bottom enclosure and are designations of portions of said shaped elastomeric container where said center horizontal plane intersects said top enclosure and said bottom enclosure.*

*29. The shaped elastomeric container of claim 1 wherein said top enclosure and said bottom enclosure are formed separately.*

*30. The shaped elastomeric container of claim 1 wherein said top enclosure is coupled to said bottom enclosure via bonding.*

*31. The shaped elastomeric container of claim 1 wherein said top enclosure and said bottom enclosure are formed separately and wherein said top enclosure is coupled to said bottom enclosure via bonding.*

*32. The shaped elastomeric container of claim 1 wherein said top enclosure and said bottom enclosure are designations of two separate parts or two separate portions of said shaped elastomeric container that are formed before bonding said two separate parts or two separate portions together.*

*33. The shaped elastomeric container of claim 1 wherein said top enclosure is coupled to said bottom enclosure via said front edge when said shaped elastomeric container is closed and wherein said top enclosure is not coupled to said bottom enclosure via said front edge when said shaped elastomeric container is open to provide said access to said inner volume.*

*34. The shaped elastomeric container of claim 1 further comprising a plurality of boundaries of contact between said bottom press-fit element and said top press-fit element and at least one gap between said plurality of boundaries of contact wherein said boundary comprises a horizontal distance between a first point of contact of a first boundary of contact and last point of contact of a last boundary of contact over which said average thickness of said bottom press-fit element and said top press-fit element are calculated, which includes a horizontal distance where any of said at least one gap occurs.*

*35. The shaped elastomeric container of claim 1 further comprising a plurality of boundaries of contact between said bottom press-fit element and said top press-fit element and at least one gap between said plurality of boundaries of contact wherein said boundary comprises a horizontal distance between a first point of contact and last point of contact in any of said plurality of boundaries of contact over which said average thickness of said bottom press-fit element and said top press-fit element are calculated.*

*36. The shaped elastomeric container of claim 1 wherein said boundary further comprises a plurality of boundaries of contact between said bottom press-fit element and said top press-fit element and at least one gap between said plurality of boundaries wherein said boundary further comprises a length of a surface of said bottom press-fit element or a length of a surface of said top press-fit element in said at least one gap.*

*37. The shaped elastomeric container of claim 1 wherein said corresponding indentations comprise recesses configured to engage said one or more vertically offset ridges wherein said lower surface of said top press-fit element and said upper surface of said bottom press-fit element comprise a first shape.*

*38. The shaped elastomeric container of claim 1 wherein said corresponding indentations comprise recesses configured to engage said one or more vertically offset ridges wherein said lower surface of said top press-fit element and said upper surface of said bottom press-fit element comprise a first shape and second shape respectively that differ from one another.*

*39. The shaped elastomeric container of claim 1 wherein said leak resistant seal resists leakage of liquids and solids from the shaped elastomeric container during storage and transport without aid of an external structure to maintain or open or close the leak resistant seal.*

*40. The shaped elastomeric container of claim 1 wherein said one or more vertically offset ridges extending horizontally from said vertical protrusion comprise linear or non-linear surfaces or both linear and non-linear surfaces.*

*41. The shaped elastomeric container with an integrated leak resistant seal of claim 1 wherein one or both of said bottom press-fit element and said top press-fit element further comprise a plurality of the vertically offset ridges extending horizontally from said vertical protrusion on both sides of said vertical protrusion.*

*42. The shaped elastomeric container with an integrated leak resistant seal of claim 1 wherein one or both of said bottom press-fit element and said top press-fit element further comprise a plurality of the vertically offset ridges extending horizontally from said vertical protrusion on both sides of said vertical protrusion wherein a first vertically offset ridge of said plurality of vertically offset ridges is wider than a second vertically offset ridge of said plurality of vertically offset ridges.*

*43. The shaped elastomeric container of claim 12 wherein said top enclosure and said bottom enclosure are formed together and coupled to one another within a mold.*

*44. The shaped elastomeric container of claim 12 wherein said top enclosure is coupled to said bottom enclosure with said elastomer.*

*45. The shaped elastomeric container of claim 12 wherein said top enclosure is coupled to said bottom enclosure via integrated molding.*

*46. The shaped elastomeric container of claim 12 wherein said top enclosure and said bottom enclosure are formed together within a mold and wherein said top enclosure is coupled to said bottom enclosure with said elastomer.*

*47. The shaped elastomeric container of claim 12 wherein said top enclosure and said bottom enclosure are formed together within a mold and wherein said top enclosure is coupled to said bottom enclosure via integrated molding.*

*48. The shaped elastomeric container of claim 12 wherein said top enclosure and said bottom enclosure are formed together within a mold and wherein said top enclosure is coupled to said bottom enclosure with said elastomer via integrated molding.*

*49. The shaped elastomeric container of claim 12 wherein said top enclosure and said bottom enclosure are designations of two parts or two portions of said shaped elastomeric container formed as one component wherein said top enclosure and said bottom enclosure are located on or above said center horizontal plane and on or below said center horizontal plane respectively.*

*50. The shaped elastomeric container of claim 12 wherein one or more of said back edge, said left edge, said right edge are continuous between said top enclosure and said bottom enclosure and are designations of portions of said shaped elastomeric container where said center horizontal plane intersects said top enclosure and said bottom enclosure.*

*51. The shaped elastomeric container of claim 12 wherein said top enclosure and said bottom enclosure are formed separately.*

*52. The shaped elastomeric container of claim 12 wherein said top enclosure is coupled to said bottom enclosure via bonding.*

*53. The shaped elastomeric container of claim 12 wherein said top enclosure and said bottom enclosure are formed separately and wherein said top enclosure is coupled to said bottom enclosure via bonding.*

*54. The shaped elastomeric container of claim 12 wherein said top enclosure and said bottom enclosure are designations of two separate parts or two separate portions of said shaped elastomeric container that are formed before bonding said two separate parts or two separate portions together.*

*55. The shaped elastomeric container of claim 12 wherein said top enclosure is coupled to said bottom enclosure via said front edge when said shaped elastomeric container is closed and wherein said top enclosure is not coupled to said bottom enclosure via said front edge when said shaped elastomeric container is open to provide said access to said inner volume.*

*56. The shaped elastomeric container of claim 12 further comprising a plurality of boundaries of contact between said bottom press-fit element and said top press-fit element and at least one gap between said plurality of boundaries of contact wherein said boundary comprises a horizontal distance between a first point of contact of a first boundary of contact and last point of contact of a last boundary of contact over which said average thickness of said bottom press-fit element and said top press-fit element are calculated, which includes a horizontal distance where any of said at least one gap occurs.*

*57. The shaped elastomeric container of claim 12 further comprising a plurality of boundaries of contact between said bottom press-fit element and said top press-fit element and at least one gap between said plurality of boundaries of contact wherein said boundary comprises a horizontal distance between a first point of contact and last point of contact in any of said plurality of boundaries of contact over which said average thickness of said bottom press-fit element and said top press-fit element are calculated.*

*58. The shaped elastomeric container of claim 12 wherein said boundary further comprises a plurality of boundaries of contact between said bottom press-fit element and said top press-fit element and at least one gap between said plurality of boundaries wherein said boundary further comprises a length of a surface of said bottom press-fit element or a length of a surface of said top press-fit element in said at least one gap.*

*59. The shaped elastomeric container of claim 12 wherein said corresponding indentations comprise recesses configured to engage said one or more vertically offset ridges*

*wherein said lower surface of said top press-fit element and said upper surface of said bottom press-fit element comprise a first shape.*

*60. The shaped elastomeric container of claim 12 wherein said corresponding indentations comprise recesses configured to engage said one or more vertically offset ridges wherein said lower surface of said top press-fit element and said upper surface of said bottom press-fit element comprise a first shape and second shape respectively that differ from one another.*

*61. The shaped elastomeric container of claim 12 wherein said leak resistant seal resists leakage of liquids and solids from the shaped elastomeric container during storage and transport without aid of an external structure to maintain or open or close the leak resistant seal.*

*62. The shaped elastomeric container of claim 12 wherein said one or more vertically offset ridges extending horizontally from said vertical protrusion comprise linear or non-linear surfaces or both linear and non-linear surfaces.*

*63. The shaped elastomeric container with an integrated leak resistant seal of claim 12 wherein one or both of said bottom press-fit element and said top press-fit element further comprise a plurality of the vertically offset ridges extending horizontally from said vertical protrusion on both sides of said vertical protrusion.*

*64. The shaped elastomeric container with an integrated leak resistant seal of claim 12 wherein one or both of said bottom press-fit element and said top press-fit element further comprise a plurality of the vertically offset ridges extending horizontally from said vertical protrusion on both sides of said vertical protrusion wherein a first vertically offset ridge of said plurality of vertically offset ridges is wider than a second vertically offset ridge of said plurality of vertically offset ridges.*

*65. The shaped elastomeric container with an integrated leak resistant seal of claim 12 wherein a height of said vertical protrusion is at least 0.2 cm and a width measured back to front of one of said one or more vertically offset ridges is at least 0.1 cm.*

*66. The shaped elastomeric container with an integrated leak resistant seal of claim 12 wherein the length of said winding path is at least 2.5 times the horizontal distance between the start of said winding path and the end of said winding path measured on the axis from back to front.*

*67. The shaped elastomeric container with an integrated leak resistant seal of claim 12 wherein said leak resistant seal further comprises*

*an upper surface of said bottom press-fit element that corresponds with a lower surface of said top press-fit element, such that said upper surface and said lower surface are in contact at a boundary when said shaped elastomeric container is closed;*

*an average thickness of said bottom press-fit element across said boundary is at least 0.25 cm; and,*

*an average thickness of said top press-fit element across said boundary is at least 0.25 cm.*

* * * * *